United States Patent
Boehm

(10) Patent No.: US 12,004,058 B2
(45) Date of Patent: *Jun. 4, 2024

(54) MEMORY POOLING BETWEEN SELECTED MEMORY RESOURCES ON VEHICLES OR BASE STATIONS

(71) Applicant: Lodestar Licensing Group LLC, Evanston, IL (US)

(72) Inventor: Aaron P. Boehm, Boise, ID (US)

(*) Notice: Subject to any disclaimer, the term of this patent is extended or adjusted under 35 U.S.C. 154(b) by 58 days.

This patent is subject to a terminal disclaimer.

(21) Appl. No.: 17/836,931

(22) Filed: Jun. 9, 2022

(65) Prior Publication Data

US 2022/0303740 A1    Sep. 22, 2022

Related U.S. Application Data

(63) Continuation of application No. 17/160,973, filed on Jan. 28, 2021, now Pat. No. 11,363,433, which is a continuation of application No. 16/142,135, filed on Sep. 26, 2018, now Pat. No. 10,932,105.

(51) Int. Cl.
*H04W 4/44* (2018.01)
*G06F 15/173* (2006.01)
*H04B 1/38* (2015.01)
*H04L 67/12* (2022.01)
*H04W 88/08* (2009.01)

(52) U.S. Cl.
CPC ........ *H04W 4/44* (2018.02); *G06F 15/17331* (2013.01); *H04B 1/38* (2013.01); *H04L 67/12* (2013.01); *H04W 88/08* (2013.01)

(58) Field of Classification Search
CPC ... H04W 4/44; H04W 88/08; G06F 15/17331; H04B 1/38; H04L 67/12
See application file for complete search history.

(56) References Cited

U.S. PATENT DOCUMENTS

| | | |
|---|---|---|
| 6,052,632 A | 4/2000 | Iihoshi |
| 7,917,599 B1 | 3/2011 | Gopalan et al. |
| 8,306,525 B2 | 11/2012 | Feher |
| 9,497,572 B2 | 11/2016 | Britt et al. |
| 11,363,433 B2 * | 6/2022 | Boehm .............. H04B 1/38 |
| 2009/0144388 A1 | 6/2009 | Gross et al. |
| 2010/0202346 A1 | 8/2010 | Sitzes |
| 2011/0038378 A1 | 2/2011 | Carter |
| 2012/0105637 A1 | 5/2012 | Yousefi |
| 2012/0222052 A1 * | 8/2012 | Magenheimer ....... G06F 15/167 719/328 |
| 2016/0247402 A1 | 8/2016 | Huang |
| 2017/0353418 A1 | 12/2017 | Feng |
| 2018/0048715 A1 | 2/2018 | Wang |
| 2018/0225254 A1 | 8/2018 | Hu |
| 2018/0300964 A1 | 10/2018 | Lakshamanan |
| 2019/0098602 A1 | 3/2019 | Costa |
| 2020/0073382 A1 | 3/2020 | Noda |

OTHER PUBLICATIONS

Choi, et al. "A Remote Memory System for High Performance Data Processing", International Journal of Future Computer and Communications, vol. 4, No. 1, Feb. 2015, 5 pp.

"5G Network Architecture—A High-Level Perspective" Huawei Technologies, Co., Ltd., Bantian Longgang District, Shenzhen, China, 2016, 21 pp.

* cited by examiner

*Primary Examiner* — Brian Whipple
(74) *Attorney, Agent, or Firm* — Brooks, Cameron & Huebsch, PLLC

(57) ABSTRACT

Apparatuses, systems, and methods related to memory pooling between selected memory resources on vehicles or base stations are described. A system using a memory pool formed as such may enable performance of functions, including automated functions critical for prevention of damage to a product, personnel safety, and/or reliable operation, based on increased access to data that may improve performance of a mission profile. For instance, one apparatus described herein includes a wireless base station coupled to a first processor coupled to a first memory resource that are configured to enable formation of a memory pool to share data between the first memory resource and a second memory resource at a vehicle responsive to a request to access the second memory resource from the first processor transmitted via the base station. The data shared by the second memory resource is determined to enable performance of a particular functionality, stored by the first memory resource, as at least part of a mission profile for transit of the vehicle.

19 Claims, 7 Drawing Sheets

770 ──▶ AUTHORIZATION CRITERIA

- PROXIMITY OF MEMORY RESOURCES ── 771
- TIMING OF A REQUEST FOR SHARED DATA ── 772
- A MATCH OF A PROTOCOL FOR WIRELESS COMMUNICATION ── 773

- TRANSMITTING, VIA A FIXED BASE STATION COUPLED TO A FIRST MEMORY RESOURCE, A REQUEST FOR DATA STORED BY A SECOND MEMORY RESOURCE AT A VEHICLE TO CONTRIBUTE TO PROCESSING OF A MISSION PROFILE BY THE FIRST MEMORY RESOURCE ── 881
- RECEIVING, VIA THE FIXED BASE STATION IN RESPONSE TO THE REQUEST, THE DATA FROM THE SECOND MEMORY RESOURCE TO CONTRIBUTE TO THE PROCESSING OF THE MISSION PROFILE ── 882

*Fig. 8*

MEMORY POOLING BETWEEN SELECTED MEMORY RESOURCES ON VEHICLES OR BASE STATIONS

PRIORITY INFORMATION

This application is a Continuation of U.S. application Ser. No. 17/160,973, filed on Jan. 28, 2021, which will issue as U.S. Pat. No. 11,363,433 on Jun. 14, 2022, which is a Continuation of U.S. application Ser. No. 16/142,135, filed on Sep. 26, 2018, which issued as U.S. Pat. No. 10,932,105 on Feb. 23, 2021, the contents of which are incorporated herein by reference.

TECHNICAL FIELD

The present disclosure relates generally to semiconductor memory and methods, and more particularly, to apparatuses, systems, and methods for memory pooling between selected memory resources on vehicles or base stations.

BACKGROUND

Memory resources are typically provided as internal, semiconductor, integrated circuits in computers or other electronic systems. There are many different types of memory, including volatile and non-volatile memory. Volatile memory can require power to maintain its data (e.g., host data, error data, etc.). Volatile memory can include random access memory (RAM), dynamic random access memory (DRAM), static random access memory (SRAM), synchronous dynamic random access memory (SDRAM), and thyristor random access memory (TRAM), among other types. Non-volatile memory can provide persistent data by retaining stored data when not powered. Non-volatile memory can include NAND flash memory, NOR flash memory, and resistance variable memory, such as phase change random access memory (PCRAM) and resistive random access memory (RRAM), ferroelectric random access memory (FeRAM), and magnetoresistive random access memory (MRAM), such as spin torque transfer random access memory (STT RAM), among other types.

Electronic systems often include a number of processing resources (e.g., one or more processors), which may retrieve instructions from a suitable location and execute the instructions and/or store results of the executed instructions to a suitable location (e.g., the memory resources). A processor can include a number of functional units such as arithmetic logic unit (ALU) circuitry, floating point unit (FPU) circuitry, and a combinatorial logic block, for example, which can be used to execute instructions by performing logical operations such as AND, OR, NOT, NAND, NOR, and XOR, and invert (e.g., NOT) logical operations on data (e.g., one or more operands). For example, functional unit circuitry may be used to perform arithmetic operations such as addition, subtraction, multiplication, and division on operands via a number of operations.

BRIEF DESCRIPTION OF THE DRAWINGS

FIG. 7 is a block diagram illustrating an example of authorization criteria that may be utilized in authorization of formation of a memory pool in accordance with a number of embodiments of the present disclosure.

FIG. 8 is a flow chart illustrating an example of formation of a memory pool between selected wirelessly utilizable memory resources implemented on a corresponding number of vehicles and/or base stations in accordance with a number of embodiments of the present disclosure.

DETAILED DESCRIPTION

Figure 1:
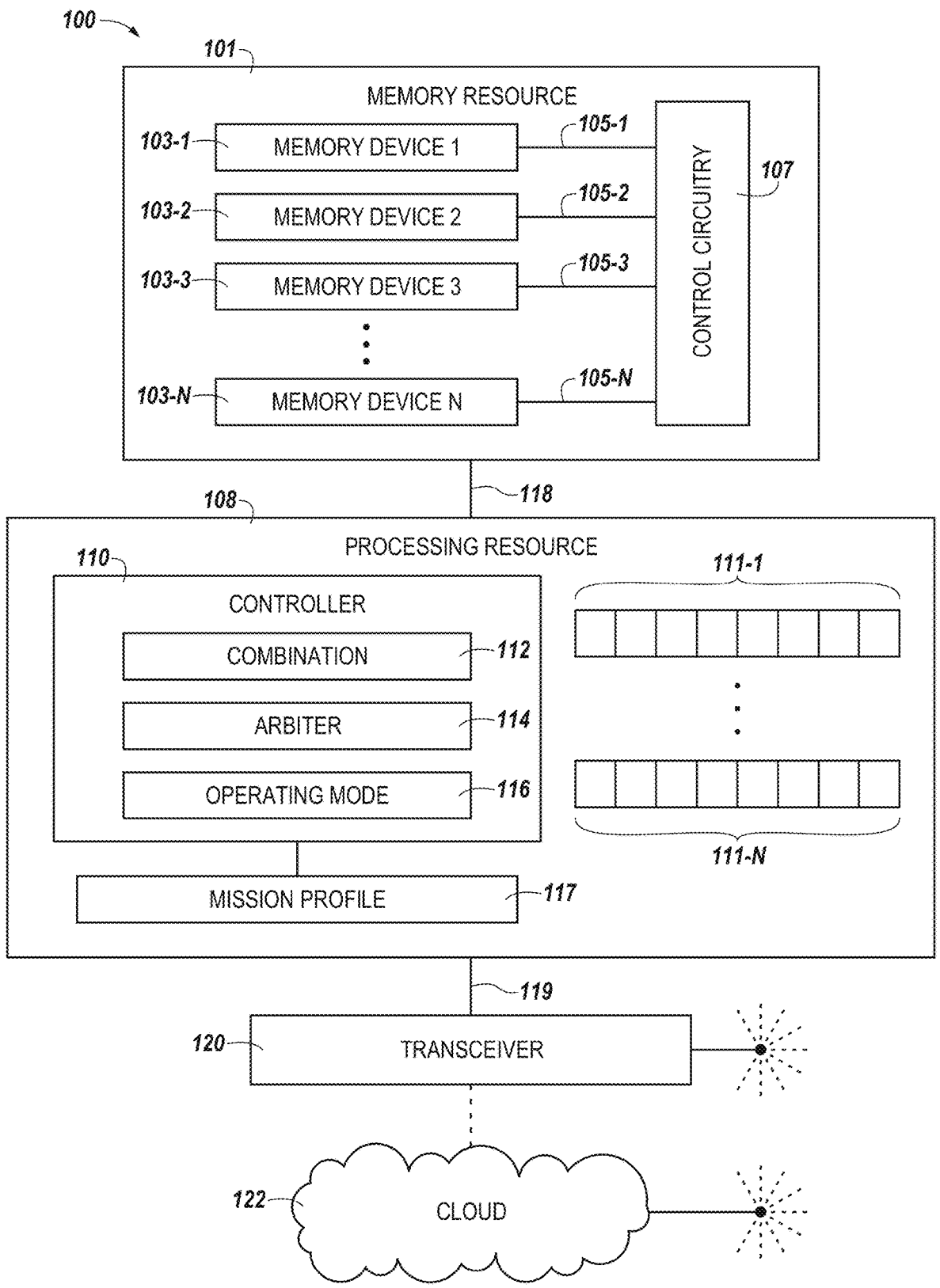
FIG. 1 is a schematic diagram illustrating an example of a wirelessly utilizable resource that may be utilized for formation of a memory pool between selected memory resources in accordance with a number of embodiments of the present disclosure.

The present disclosure includes systems, apparatuses and methods associated with memory pooling between selected memory resources on vehicles and/or base stations. In a number of embodiments, an apparatus includes a wireless base station coupled to a first processor coupled to a first memory resource that are configured to enable formation of a memory pool to share data between the first memory resource and a second memory resource at a vehicle responsive to a request to access the second memory resource from the first processor transmitted via the base station. The data shared by the second memory resource is determined to enable performance of a particular functionality, stored by the first memory resource, as at least part of a mission profile for transit of the vehicle.

A processing resource (e.g., one or more processors, microprocessors, or some other type of controlling circuitry), in combination with a memory resource as described herein, may be operated at a high speed (e.g., at a bandwidth of greater than 10 gigabits per second (GB/s)) for performance of some operations. To contribute to such performance, faster processing resources and/or more memory resources may be combined on a particular computing device. However, the higher the used bandwidth of and/or the more such resources are operating on the computing device, the higher the failure rate (e.g., failures in time (FIT)) and/or the lower the mean time between failures (MTBF) may become. Combining a processing resource with a lower bandwidth and/or a memory resource having less memory capacity (e.g., fewer memory devices, banks, arrays, etc.) on such computing devices may comparatively reduce the failure rate.

However, performance of particular functions (e.g., functionalities that are programmed and/or programmable to yield an intended outcome and/or a number of operations that are performed as sub-portions of the functionality) may rely on an ability of a processing resource, in combination with a memory resource, to operate at a bandwidth high enough to possibly result in a high FIT and/or a low MTBF. Such functions may include autonomous functions, which may, for example, use machine learning and/or artificial intelligence to perceive an environment and adjust operations accordingly to improve probability of yielding an intended outcome of a particular functionality (e.g., without human interaction and/or supervision).

Proper performance of the operations contributing to such automated functionalities may be critical for prevention of damage to a product including such automated functionalities (e.g., autonomous vehicles, such as automobiles, trucks, trains, airplanes, rockets, space stations, etc., among many other possibilities) and/or safety of transport of an object (e.g., a human passenger or any other object) being transited via an autonomous vehicle. Hence, automated functionalities utilized in such implementations may benefit from having lower error rates in execution of instructions for performance and/or selection of the operations contributing to the automated functionalities (e.g., relative to higher error rates considered acceptable for other utilities, such as cellular telephones, smart phones, personal computers, etc.).

Two ways to affect bandwidth are to adjust a bit width (e.g., a number of channels) on a bus for input and output (I/O) of data and to adjust a speed for I/O of data by a processor. For example, an implementation of a processor (e.g., a processing resource) having a 256 bit interface running at 14 GB/s and coupled to 8 DRAM devices, including one or more banks, (e.g., a memory resource) may have a high bandwidth of 448 GB/s, which may be correlated with a high cost, a high power consumption, a high operating temperature, and/or a short battery life, along with a high FIT rate. An implementation of a processor having a 32 bit interface running at 6 GB/s and coupled to 1 DRAM device may have a lower bandwidth of 25 GB/s, which may be correlated with a lower cost, a lower power consumption, a lower operating temperature, and/or a longer battery life, along with a lower FIT rate. However, reduction of the bandwidth of the processing resources and/or the number of memory resources combined on a particular computing device may be in conflict with meeting intended performance levels of an automated functionality and/or an implementation including the functionality.

In contrast, consistent with a number of embodiments described herein, there may be a plurality (e.g., a network) of memory resources and processing resources (e.g., formed and/or positioned on a corresponding plurality of vehicles) wirelessly connected (e.g., coupled) by a transceiver resource (e.g., a number of radio frequency (RF) transmitter/receivers abbreviated as transceivers) to share data by formation of a memory pool. Such a vehicle to vehicle memory pool may, for example, include 100 vehicles, where each vehicle may include a 32 bit interface running at 6 GB/s and coupled to 1 DRAM device. The memory pool formed as such may effectively have a 3,200 bit wide bus with a total available bandwidth of around 2600 GB/s. To enable such a bus width and/or bandwidth between separate vehicles, the wireless coupling may be performed using fifth generation (5G) wireless technology, although embodiments are not limited to using 5G technology. The actual size of the memory pool, along with the corresponding bit width and/or bandwidth, may be scalable dependent upon the number of vehicles (e.g., unitary vehicles and/or transport vehicles, as described herein) included in the memory pool, among other considerations described herein.

Embodiments may be described herein in connection with "transport vehicles" for simplicity, although embodiments are not intended to be limited to such transport vehicles and may, as appropriate to the context, include "unitary vehicles," as described herein, or any other type of conveyance that may be termed a vehicle. In addition, the vehicles described herein are intended to encompass those types of vehicles having transit (e.g., steering, acceleration, braking, etc.) directed by a human (e.g., a driver) and/or automated vehicles having transit directed by automated functionalities, as described herein or otherwise.

Hence, formation of a memory pool as such may increase a cumulative computation power (e.g., capacity) and/or reliability of the combination of memory resources and processing resources on the plurality of vehicles (e.g., relative to a processing resource operating at a higher bandwidth and coupled to a higher number of memory banks on each of the vehicles). The reduced complexity and/or bandwidth of such a processing resource and memory resource implementation may be associated with lower cost, power consumption, operating temperature, and/or a longer battery life. The reliability may be increased by a reduced FIT rate for each processing resource and/or memory resource on each individual vehicle, by a failed processing resource and/or memory resource not being included in the memory pool in the first place, and/or by a failed processing resource and/or memory resource being replaced by another processing resource and/or memory resource on another vehicle or vehicles.

The figures herein follow a numbering convention in which the first digit or digits of a reference number correspond to the figure number and the remaining digits identify an element or component in the figure. Similar elements or components between different figures may be identified by the use of similar digits. For example, 108 may reference element "08" in FIG. 1, and a similar element may be referenced as 608 in FIG. 6.

FIG. 1 is a schematic diagram illustrating an example of a wirelessly utilizable resource that may be utilized for formation of a memory pool between selected memory resources in accordance with a number of embodiments of the present disclosure. The wirelessly utilizable resource 100 illustrated in FIG. 1 is intended to represent an embodiment of one implementation of a combination of various resources. The illustrated wirelessly utilizable resource 100 may represent an embodiment of an "apparatus" as described herein, although such apparatuses may include more or fewer elements than shown in FIG. 1. The wirelessly utilizable resource 100 also may represent an example of an embodiment of a plurality of such resources (e.g., 100-1, 100-2, . . . , 100-N), which may be utilizable in combination to enable formation of a memory pool between at least one memory resource and another memory resource, an embodiment of one of which is shown at 101 in FIG. 1. For clarity, one memory resource and another memory resource may be distinguished from each other as a first memory resource and a second memory resource denoted respectively by reference numbers 101-1 and 101-2. Similarly, one processing resource and another processing resource may be distinguished from each other as a first processing resource and a second processing resource denoted respectively by reference numbers 108-1 and 108-2. Other components presented herein may be similarly distinguished. As described herein, embodiments are not limited to two memory resources 101, processing resources 108, and corresponding other components being included in a memory pool.

A "memory resource" as used herein is a general term intended to at least include memory (e.g., memory cells) arranged, for example, in a number of bank groups, banks, bank sections, subarrays, and/or rows of a number of memory devices. The embodiment of the memory resource 101 illustrated in FIG. 1 is shown to include, by way of example, a plurality of memory devices 103-1, 103-2, ..., 103-N. The memory resource 101 may be or may include, in a number of embodiments, a number of volatile memory devices formed and/or operable as RAM, DRAM, SRAM, SDRAM, and/or TRAM, among other types of volatile memory devices. Alternatively or in addition, the memory resource 101 may be or may include, in a number of embodiments, a number of non-volatile memory devices formed and/or operable as NAND, NOR, other Flash memory devices, PCRAM, RRAM, FeRAM, MRAM, STT RAM, phase change memory, and/or 3DXPoint, among other types of non-volatile memory devices.

Each memory device 103 may, in a number of embodiments, represent a memory device on which a number of bank groups, banks, bank sections, subarrays, and/or rows are configured (e.g., dedicated and/or programmable) to store data values (e.g., instructions) for performance of a particular functionality. Each functionality may include storage of data values to direct performance of a number of operations that contribute to performance of the functionality. By way of example and not by way of limitation, such functionalities may include steering a vehicle (e.g., a unitary vehicle and/or a transport vehicle) to reach an intended destination, steering the vehicle to avoid obstructions, obeying traffic signals, and/or enabling the formation of a memory pool between the memory resource 101 formed and/or positioned on the vehicle and at least one other memory resource formed and/or positioned on another vehicle, among many other possibilities for functionalities to be stored by the memory devices 103 of the memory resource 101 related to vehicles or other implementations.

Each of the plurality of memory devices 103-1, 103-2, ..., 103-N of the memory resource 101 may be coupled to a corresponding plurality of channels 105-1, 105-2, ..., 105-N. The plurality of channels 105-1, 105-2, ..., 105-N are described further in connection with FIG. 6. The plurality of channels 105-1, 105-2, ..., 105-N may be selectably coupled to control circuitry 107 of the memory resource 101. The control circuitry 107 may be configured to enable data values for and/or instructions (e.g., commands) related to performance of a particular functionality to be directed to an appropriate one or more of the plurality of memory devices 103-1, 103-2, ..., 103-N.

In a number of embodiments, the data values and/or instructions may be provided by (e.g., sent from) a processing resource 108 (e.g., from a controller 110 thereof). The instructions may be sent from the processing resource 108 to the memory resource 101 by the resources being coupled via a bus 118. The bus 118 may include a number of I/O lines (e.g., selectably coupled to the channels 105 via switches 661 shown in and described in connection with FIG. 6) sufficient for sending instructions to the memory resource 101 and/or for input of data to the memory resource 101 and/or output of data from the memory resource 101 for execution by the processing resource 108 (e.g., in performance of the various functionalities).

The controller 110 of the processing resource 108 may include and/or be physically associated with (e.g., be coupled to) a number of components configured to contribute to operations controlled (e.g., performed) by the controller 110. Such components may, in a number of embodiments, include a combination component 112 configured to assess resource availability in a plurality of separate memory devices 101, an arbiter component 114 configured to selectably determine whether a first memory resource and a separate second memory resource (e.g., on a different vehicle than the first memory resource) are authorized to enable formation of a memory pool, and/or an operating mode component 116 configured to determine a particular number of separate second memory resources to be included in a memory pool with the first memory resource and to direct modulation of operating parameters for access to and transmission of data from the separate second memory resources, as described further herein.

Each memory resource 101 may, in a number of embodiments, be coupled to a respective processing resource 108 configured to send a request for formation of a memory pool. Alternatively or in addition, each memory resource 101 may be coupled to a respective processing resource 108 configured to respond to a request for formation of the memory pool sent from a processing resource 108 of another memory resource 101. For example, in a number of embodiments, each memory resource 101 on a vehicle may, in a number of embodiments, be coupled to a respective processing resource 108 configured to both send a request for formation of the memory pool and respond to a request for formation of the memory pool sent from a processing resource 108 on another vehicle. In some embodiments, however, particular vehicles may be configured to only send a request for formation of the memory pool or respond to a request for formation of the memory pool.

In a number of embodiments, a first memory resource 101-1 and a second memory resource 101-2 each may include at least one volatile memory device 103 (e.g., in a DRAM configuration, among other possible configurations of volatile memory) coupled to a respective processing resource 108 configured to wirelessly share data. Alternatively or in addition, a first memory resource 101-1 and a second memory resource 101-2 each may include at least one non-volatile memory device 103 (e.g., in a NAND configuration, among other possible configurations of non-volatile memory) coupled to a respective processing resource 108 configured to wirelessly share data.

The processing resource 108 may, in a number of embodiments, include and/or be physically associated with a mission profile 117. The mission profile 117 may be selectably coupled to the controller 110 and/or the components 112, 114, 116 associated with the controller 110. The mission profile 117 may be stored by and/or accessible (e.g., for performance of read and/or write operations directed by the controller 110) in, for example, in memory (e.g., SRAM) (not shown) of the processing resource 108. Alternatively or in addition, the mission profile 117 may be stored by the memory resource 101 (e.g., by a memory device 103) and may be accessible (e.g., via bus 118, control circuitry 107, and/or channels 105) by the controller 110 of the processing resource 108 for performance of read and/or write operations.

As such, the mission profile 117 may, in a number of embodiments, be formed and/or positioned on a transport vehicle in order to provide a resource for instructions to be executed by the controller 110 of the processing resource 108 in performance of various functionalities stored on the memory resource 101 (e.g., on the memory devices 103 of the memory resource 101). The memory resource 101 may be selectably coupled to a number of hardware components (e.g., positioned and/or formed as parts of the transport vehicle) configured to perform actions to accomplish a mission stored on the mission profile 117 and consistent with the functionalities stored on the memory resource 101. On a transport vehicle, such hardware components may include hardware to, for example, enable steering, braking, and/or acceleration of the transport vehicle to enable arrival at an intended destination at an intended time in order to accomplish the mission stored on the mission profile 117.

To be "formed on" a transport vehicle is intended to mean that a resource (e.g., at least one of the resources 101, 108, and/or 120 shown and described in connection with FIG. 1) may be formed on (e.g., during or following manufacture) hardware (e.g., structural components and/or a computing device) of the transport vehicle. Alternatively of in addition, to be "formed on" a transport vehicle is intended to mean that a resource may be "positioned on" the transport vehicle to provide, for example, a computing device of the transport vehicle as hardware, software, and/or firmware following manufacture of the transport vehicle (e.g., as a factory- and/or dealer-installed option(s) or as an after-market purchase). To be "formed on" and/or "positioned on" a transport vehicle may be abbreviated herein by stating that a resource is "on" the transport vehicle.

The mission profile 117 may, in a number of embodiments, include an intended destination, an intended arrival time, and/or an intended route to be followed to reach the intended destination at the intended arrival time, among many other possibilities for inclusion in the mission profile 117. The functionalities and/or operations on the memory resource 101 may be stored data values (e.g., code) that when executed by the controller 110 on the processing resource 108 is intended to enable accomplishment of the mission profile 117. However, a potential for accomplishment of the mission profile 117 may be improved by (e.g., may require) access to and transfer of data from other memory resources 101 (e.g., by formation of a transport vehicle to transport vehicle memory pool).

The transferred data may relate to potential obstacles (e.g., unexpected obstacles) that may be encountered during transit (e.g., driving) along the intended route. Data transferred from a number of memory resources 101 (e.g., on a number of transport vehicles located at or near various locations along the intended route) may enable compensatory actions to be performed (e.g., based upon storing corresponding data on the memory resource 101) to accomplish or more closely match the mission profile 117 (e.g., by avoiding such an obstacle and/or following a different route to reach the intended destination, among other possibilities). The potential obstacles may include adverse weather conditions (e.g., wind, fog, rain, snow, temperature, etc.), traffic jams, pedestrians on the route (e.g., a parade, protesters, etc.), an accident involving another vehicle and/or pedestrian, speed traps, road construction, slippery road surfaces, among many other possible obstacles.

As such, a processing resource 108 for a memory resource 101 on a first vehicle may send a request (e.g., automatically and/or in response to a directive from a human driver) to processing resources on other vehicles for access to a number of memory resources that enable formation of a memory pool to potentially improve functionalities to enable accomplishment of the mission profile 117. The other vehicles may be located within a proximity of the intended route or potential alternative routes. In a number of embodiments, information (e.g., data) may be provided by (e.g., sent from) a number of base stations (e.g., as shown at 225 and 325 and described in connection with FIGS. 2 and 3, respectively) and/or infrastructure (e.g., houses, police/fire/ news stations, businesses, factories, etc., as shown at 444, 445, and 446 and described in connection with FIG. 4) located within a proximity of the intended route or potential alternative routes. The data of a memory pool formed with these resources may be in addition to or instead of data sent from resources on other vehicles.

Determining and/or following (e.g., tracking) positions (e.g., geographically and/or relative to a particular point) of processing resources 108, base stations 225, 325, and/or infrastructure 444, 445, 446 individually and/or relative to one another may, in a number of embodiments, utilize a Global Positioning System (GPS). GPS is a space-based radionavigation system operated by the United States government. It is a global navigation satellite system that may provide geolocation and time information to a GPS receiver on or near the Earth where there is an unobstructed line of sight to four or more GPS satellites. Alternatively or in addition, the determining and/or tracking of positions may be performed via triangulation relative to, for example, positions of a number of base stations, cell towers, etc., and/or via photomapping (e.g., using satellite and/or ground based digital photographic resources), among other possibilities.

The processing resource 108 (e.g., on each of the plurality of unitary vehicles 331 and/or the plurality of transport vehicles 334 shown in and described in connection with FIG. 3) may be coupled 119 to a transceiver resource 120. The transceiver resource 120 may be configured to wirelessly share data between at least two of a plurality of memory resources 101 via a processing resource 108 coupled 118 to each of the memory resources 101. Each of a plurality of the memory resources may, in a number of embodiments, be on a corresponding plurality of vehicles (e.g., on each of the plurality of unitary vehicles 331 and/or the plurality of transport vehicles 334). Each transceiver resource 120 may include, in a number of embodiments, one or more radio frequency (RF) transceivers (e.g., as shown at 661 and described in connection with FIG. 6). A transceiver, as described herein, is intended to mean a device that includes both a transmitter and a receiver. The transmitter and receiver may, in a number of embodiments, be combined and/or share common circuitry. In a number of embodiments, no circuitry may be common between the transmit and receive functions and the device may be termed a transmitter-receiver. Other devices consistent with the present disclosure may include transponders, transverters, and/or repeaters, among similar devices.

In a number of embodiments, the transceiver resource 120 may be wirelessly couplable to a base station 225 and/or a cloud processing resource 122 to enable formation of the memory pool. A cloud processing resource 122, as described herein, is intended to include enablement of access to networking resources from a centralized third-party provider using wide area networking (WAN) or Internet-based access technologies (e.g., as opposed to wireless local area networking (WLAN)). Improved Internet access and/or more reliable WAN bandwidth (e.g., suitable for using 5G wireless technology) may enable processing of network management functions in the cloud. A cloud processing resource 122 may provide centralized management, connectivity, security, and/or control of the network. This may include distribution of wireless access routers or branch-office devices (e.g., in base stations 225) with centralized management in the cloud.

As described herein, the wireless coupling may use 5G technology. 5G may be designed to utilize a higher frequency portion of the wireless spectrum, operating in millimeter wave bands (e.g., 28, 38, and/or 60 gigahertz), compared to other wireless communication technologies (e.g., 4G and previous generations, among other technologies). The millimeter wave bands of 5G may enable data to be transferred more rapidly than technologies using lower frequency bands. For example, a 5G network is estimated to have transfer speeds up to hundreds of times faster than a 4G network, which may enable data transfer rates in a range of tens of megabits per second (MB/s) to tens of GB/s for tens of thousands of users at a time (e.g., in a memory pool, as described herein) by providing a high bandwidth. The actual size of the memory pool, along with the corresponding bandwidth, may be scalable dependent upon the number of vehicles included in the memory pool, among other considerations described herein.

For example, the data to be wirelessly shared by at least two memory resources 101 in a memory pool (e.g., a network) may, in a number of embodiments, be transferred directly vehicle to vehicle, be transferred vehicle to vehicle indirectly via a base station 225, and/or be uploaded to a cloud processing resource 122 (e.g., from a vehicle and/or a base station) via a first processing resource 108 coupled to a first transceiver resource 120. When uploaded to the cloud processing resource 122, the data may be made accessible (e.g., processed) by the cloud processing resource 122 for download via a second (e.g., separate) processing resource 108 coupled to a second transceiver resource 120. The cloud processing resource 122 may be utilized instead of, or in addition to, networking by directly transmitting and/or by directly receiving the data between the vehicles and/or utilizing a base station(s) 225, 325 and/or infrastructure 444, 445, 446 as an intermediary transceiver.

As shown in FIG. 1, the processing resource 108 includes a plurality of sets of logic units 111-1, . . . , 111-N (collectively referred to as logic units 111). In a number of embodiments, the processing resource 108 may be configured to execute a plurality of sets of instructions using the plurality of sets of logic units 111-1, . . . , 111-N and transmit outputs obtained as a result of the execution via a device-to-device communication technology that is operable in a number of frequency bands including the EHF band. The outputs transmitted may be communicated with other devices such as wirelessly utilizable resources (e.g., wirelessly utilizable resources 200-1, . . . , 200-5.

Although embodiments are not so limited, at least one of the logic units 111 can be an arithmetic logic unit (ALU), which is a circuit that can perform arithmetic and bitwise logic operations on integer binary numbers and/or floating point numbers. As an example, the ALU can be utilized to execute instructions by performing logical operations such as AND, OR, NOT, NAND, NOR, and XOR, and invert (e.g., inversion) logical operations on data (e.g., one or more operands). The processor resource 108 may also include other components that may be utilized for controlling logic units 111. For example, the processing resource 108 may also include a control logic (e.g., configured to control a data flow coming into and out of the logic units 111) and/or a cache coupled to each of the plurality of set of logic units 111-1, . . . , 111-N.

A number of ALUs can be used to function as a floating point unit (FPU) and/or a graphics processing unit (GPU). Stated differently, at least one of the plurality of sets of logic units 111-1, . . . , 111-N may be FPU and/or GPU. As an example, the set of logic units 111-1 may be the FPU while the set of logic units 111-N may be the GPU.

As used herein, "FPU" refers to a specialized electronic circuit that operates on floating point numbers. In a number of embodiments, FPU can perform various operations such as addition, subtraction, multiplication, division, square root, and/or bit-shifting, although embodiments are not so limited. As used herein, "GPU" refers to a specialized electronic circuit that rapidly manipulate and alter memory (e.g., memory resource 101) to accelerate the creation of image in a frame buffer intended for output to a display. In a number of embodiments, GPU can include a number of logical operations on floating point numbers such that the GPU can perform, for example, a number of floating point operations in parallel.

In some embodiments, GPU can provide non-graphical operation. As an example, GPU can also be used to support shading, which is associated with manipulating vertices and textures with man of the same operations supported by CPUs, oversampling and interpolation techniques to reduce aliasing, and/or high-precision color spaces. These example operations that can be provided by the GPU are also associated with matrix and vector computations, which can be provided by GPU as non-graphical operations. As an example, GPU can also be used for computations associated with performing machine-learning algorithms and is capable of providing faster performance than what CPU is capable of providing. For example, in training a deep learning neural networks, GPUs can be 250 times faster than CPUs. As used herein, "machine-learning algorithms" refers to algorithms that uses statistical techniques to provide computing systems an ability to learn (e.g., progressively improve performance on a specific function) with data, without being explicitly programmed.

GPU can be present on various locations. For example, the GPU can be internal to (e.g., within) the CPU (e.g., of the network device 102). For example, the GPU can be on a same board (e.g., on-board unit) with the CPU without necessarily being internal to the GPU. For example, the GPU can be on a video card that is external to a wirelessly utilizable resource (e.g., wirelessly utilizable resources 200-1, . . . , 200-5 as described in connection with FIG. 2). Accordingly, the wirelessly utilizable resource 100 may be an additional video card that can be external to and wirelessly coupled to a network device such as the wirelessly utilizable resource for graphical and/or non-graphical operations.

A number of GPUs of the processing resource 108 may accelerate a video decoding process. As an example, the video decoding process that can be accelerated by the processors 214 may include a motion compensation (mocomp), an inverse discrete cosine transform (iCDT), an inverse modified discrete cosine transform (iMDCT), an in-loop deblocking filter, an intra-frame prediction, an inverse quantization (IQ), a variable-length decoding (VLD), which is also referred to as a slice-level acceleration, a spatial-temporal deinterlacing, an automatic interlace/progressive source detection, a bitstream processing (e.g., context-adaptive variable-length coding and/or context-adaptive binary arithmetic coding), and/or a perfect pixel positioning. As used herein, "a video decoding" refers to a process of converting base-band and/or analog video signals to digital components video (e.g., raw digital video signal).

In some embodiments, the processing resource 108 may be further configured to perform a video encoding process, which converts digital video signals to analog video signals. For example, if the network device (including a display) requests the wirelessly utilizable resource 100 to return a specific form of signals such as the analog video signals, the wirelessly utilizable resource 100 may be configured to convert, via the processing resource 108, digital video signals to analog video signals prior to transmitting those wirelessly to the network device.

The wirelessly utilizable resource 100 includes the transceiver 120. As used herein, a "transceiver" may be referred to as a device including both a transmitter and a receiver. In a number of embodiments, the transceiver 120 may be and/or include a number of radio frequency (RF) transceivers. The transmitter and receiver may, in a number of embodiments, be combined and/or share common circuitry. In a number of embodiments, no circuitry may be common between the transmit and receive functions and the device may be termed a transmitter-receiver. Other devices consistent with the present disclosure may include transponders, transverters, and/or repeaters, among similar devices.

In a number of embodiments, a communication technology that the processing resource 108 can utilize may be a device-to-device communication technology as well as a cellular telecommunication technology, and the processing resource 108 may be configured to utilize the same transceiver (e.g., transceiver 120) for both technologies, which may provide various benefits such as reducing a design complexity of the wirelessly utilizable resource 100. As an example, consider devices (e.g., wirelessly utilizable resources 200-1, . . . , 200-5 and/or any other devices that may be analogous to the wirelessly utilizable resource 100) in previous approaches, in which the device utilizes a device-to-device communication technology as well as a cellular telecommunication technology in communicating with other devices. The device in those previous approaches may include at least two different transceivers (e.g., each for the device-to-device communication technology and the cellular telecommunication technology, respectively) because each type of communication technology may utilize different network protocols that would further necessarily utilize unique transceivers. As such, the device implemented with different transceivers would increase a design (e.g., structural) complexity that may increase costs associated with the device. On the other hand, in a number of embodiments, the processing resource 108 is configured to utilize the same network protocol for both technologies (e.g., device-to-device communication and cellular telecommunication technologies), which eliminates a need of having different transceivers for different types of wireless communication technologies. Accordingly, a number of the present disclosure may reduce a design complexity of the wirelessly utilizable resource 100.

In a number of embodiments, since resources of the wirelessly utilizable resource 100 can be wirelessly utilizable, the wirelessly utilizable resource 100 may be free of those physical interfaces that would have been included, to physically connect to a motherboard of a network device and/or a display, in expansion cards of previous approaches. For example, the wirelessly utilizable resource 100 as an expansion card may not include a physical interface, which would have been utilized to connect to the mother board, such as a physical bus (e.g., S-100 bus, industry standard architecture (ISA) bus, NuBus bus, Micro Channel bus (or Micro Channel Architecture (MCA), extended industry standard architecture (EISA) bus, VESA local bus (VLB), peripheral component interconnect (PCI) bus, ultra port architecture (UPA), universal serial bus (USB), peripheral component interconnect extended (PCI-X), peripheral component interconnect express (PCIe)) or other physical channels such as accelerated graphics port (AGP) that would have been utilized to connect to the motherboard. For example, the wirelessly utilizable resource 100 as an expansion card may not include a physical interface, which would have been utilized to connect to the display, such as a video graphics array (VGA), digital video interface (DVI), high-definition multimedia interface (HDMI), and/or display port. Accordingly, the wirelessly utilizable resource 100 may be configured to transmit, via the transceiver 120, those signals, which would have been transmitted by those physical interfaces listed above, wirelessly to the network device and/or display. For example, the signals that can be wirelessly transmitted via the transceiver 120 may include compressed and/or uncompressed digital video signals (that would have been transmitted by HDMI and/or VGA), compressed and/or uncompressed audio signals (that would have been transmitted by HDMI), and/or analog video signals (that would have been transmitted by VGA).

Figure 2:
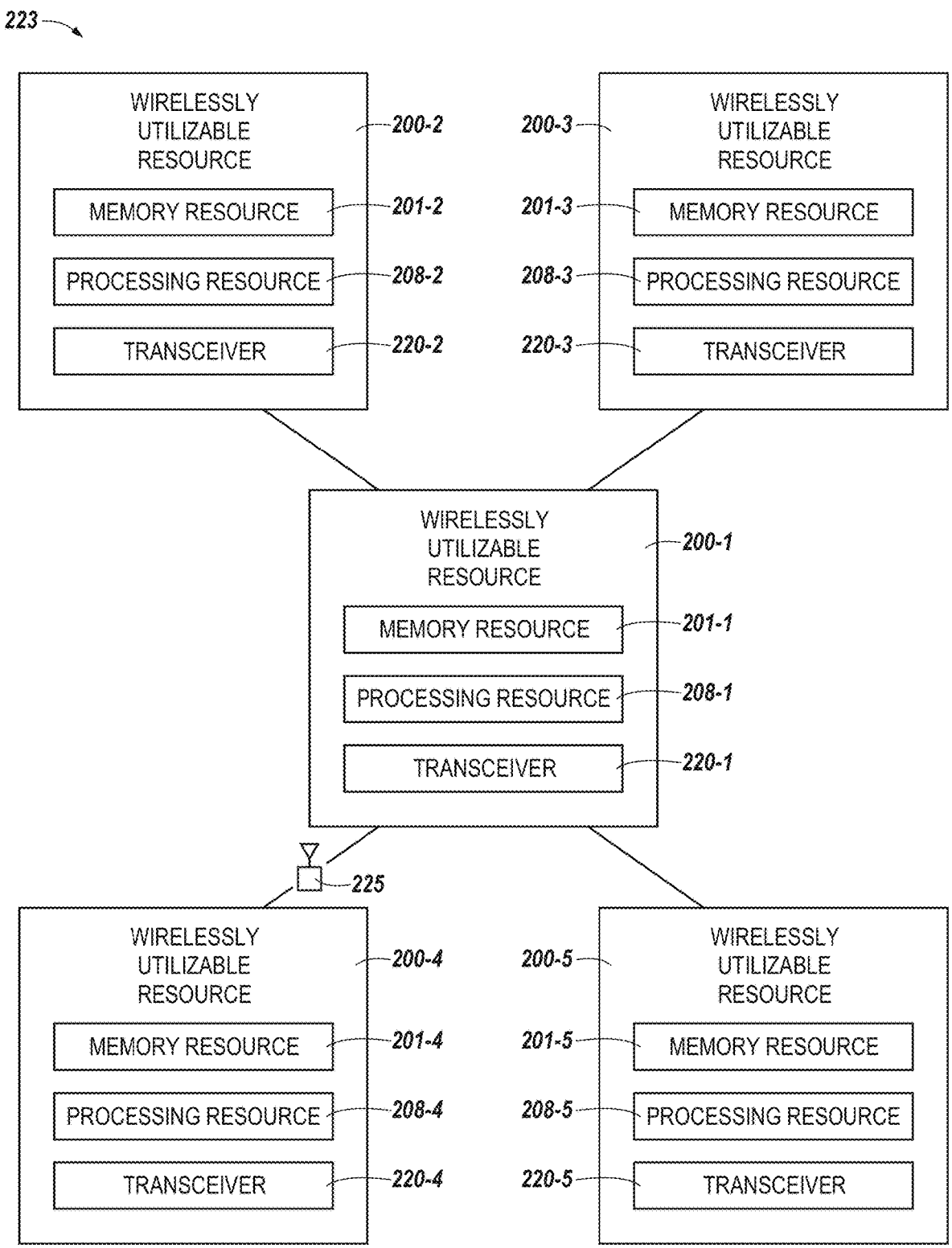
FIG. 2 is a block diagram of examples of a system including wirelessly utilizable resources in accordance with a number of embodiments of the present disclosure.

Further, the wirelessly utilizable resource 100 may be utilized by other wirelessly utilizable resources (e.g., wirelessly utilizable resources 200-1, . . . , 200-5 in FIG. 2) via a device-to-device communication technology that is operable in an EHF band. The communication technology operable in the EHF band can include a fifth generation (5G) technology or later technology. 5G technology may be designed to utilize a higher frequency portion of the wireless spectrum, including an EHF band (e.g., ranging from 30 to 300 GHz as designated by the ITU).

As used herein, the device-to-device communication technology refers to a wireless communication performed directly between a transmitting device and a receiving device, as compared to a wireless communication technology such as the cellular telecommunication technology and/or those communication technologies based on an infrastructure mode, by which network devices communicate with each other by firstly going through an intermediate network device (e.g., base station and/or Access Point (AP)). As such, via the device-to-device communication technology, data to be transmitted by the transmitting device may be directly transmitted to the receiving device without routing through the intermediate network device (e.g., base station 225), as described in connection with FIG. 2). In some embodiments. the device-to-device communication may rely on existing infrastructures (e.g., network entity such as a base station); therefore, can be an infrastructure mode. For example, as described herein, the device-to-device communication whose transmission timing is scheduled by a base station can be an infrastructure mode. In some embodiments, the receiving and transmitting devices may communicate in the absent of the existing infrastructures; therefore, can be an ad-hoc mode. As used herein, "an infrastructure mode" refers to an 802.11 networking framework in which devices communicate with each other by first going through an intermediary device such as an AP. As used herein, "ad-hoc mode" refers to an 802-11 networking framework in which devices communicate with each other without the use of intermediary devices such as an AP. The term "ad-hoc mode" can also be referred to as "peer-to-peer mode" or "independent Basic Service Set (IBSS)."

As used herein, the cellular telecommunication technology refers to a technology for wireless communication performed indirectly between a transmitting device and a receiving device via a base station, as compared to those types of wireless communication technologies including a device-to-device communication technology. Cellular telecommunications may be those that use resources of a frequency spectrum restricted or regulated by a governmental entity. License frequency spectrum resources may be scheduled for use or access by certain devices and may be inaccessible to other devices. By contrast, resources of shared or unlicensed frequency spectrum may be open and available for use by many devices without the necessity of a governmental license. Allocating licensed and shared or unlicensed frequency resources may present different technical challenges. In the case of licensed frequency spectrum, resources may be controlled by a central entity, such as a base station or entity within a core network. While devices using resources of shared or unlicensed frequency spectrum may contend for access (e.g., one device may wait until a communication channel is clear or unused before transmitting on that channel). Sharing resources may allow for broader utilization at the expense of guaranteed access.

Techniques described herein may account for, or may use, both licensed and unlicensed frequency spectrum. In some communication schemes, device-to-device communication may occur on resources of a licensed frequency spectrum, and such communications may be scheduled by a network entity (e.g., a base station). Such schemes may include certain 3GPP-developed protocols, like Long-Term Evolution (LTE) or New Radio (NR). A communication link between devices (e.g. user equipments (UEs)) in such schemes may be referred to as sidelink, while a communication link from a base station to a device may be referred to as a downlink and a communication from a device to a base station may be referred to as an uplink.

In other schemes, device-to-device communication may occur on resources of unlicensed frequency spectrum, and devices may contend for access the communication channel or medium. Such schemes may include WiFi or MulteFire. Hybrid schemes, including licensed-assisted access (LAA) may also be employed.

As used herein, an EHF band refers to a band of radio frequencies in an electromagnetic spectrum ranging from 30 to 300 gigahertz (GHz) as designated by the International Telecommunication Union (ITU), and as described further herein. Ranges of radio frequencies as designated by the ITU can include extremely low frequency (ELF) band ranging from 3 to 30 Hz, super low frequency (SLF) band ranging from 30 Hz to 300 Hz, ultra low frequency (ULF) band ranging from 300 Hz to 3 kilohertz (kHz), very low frequency (VLF) band ranging from 3 to 30 kHz, low frequency (LF) band ranging from 30 kHz to 300 kHz, medium frequency (MF) band ranging from 300 kHz to 3 megahertz (MHz), high frequency (HF) band ranging from 3 MHz to 30 MHz, very high frequency (VHF) band ranging from 30 MHz to 300 MHz, ultra high frequency (UHF) band ranging from 300 MHz to 3 GHz, super high frequency (SHF) band ranging from 3 GHz to 30 GHz, extremely high frequency (EHF) band ranging from 30 GHz to 300 GHz, and tremendously high frequency (THF) band ranging from 0.3 to 3 terahertz (THz).

A number of embodiments of the present disclosure can provide various benefits by utilizing a network communication that is operable in a number of frequency bands including a higher frequency portion (e.g., EHF) of the wireless spectrum, as compared to those network communication technologies that utilizes a lower frequency portion of the wireless spectrum only. As an example, the EHF bands of 5G technology may enable data to be transferred more rapidly than technologies (e.g., including technologies of previous generations) using lower frequency bands only. For example, a 5G network is estimated to have transfer speeds up to hundreds of times faster than a 4G network, which may enable data transfer rates in a range of tens of megabits per second (MB/s) to tens of GB/s for tens of thousands of users at a time (e.g., in a memory pool, as described herein) by providing a high bandwidth. For example, a 5G network provides faster transfer rates than the 802.11-based network such as WiFi that operate on unlicensed 2.4 GHz radio frequency band (e.g., Ultra High Frequency (UHF) band). Accordingly, a number of embodiments can enable the wirelessly utilizable resource 100 to be used at a high transfer speed as if the wirelessly utilizable resource 100 were wired to the wirelessly utilizable resource (e.g., wirelessly utilizable resources 200-1, ..., 200-5).

In addition to the EHF band, the communication technology of the communication can also be operable in other frequency bands such as the UHF band and the SHF band. As an example, the communication technology can operate in a frequency band below 2 GHz (e.g., low 5G frequencies) and/or in a frequency band between 2 GHz and 6 GHz (e.g., medium 5G frequencies) in addition to a frequency band above 6 GHz (e.g., high 5G frequencies). Further details of a number of frequency bands (e.g., below 6 GHz) in which the 5G technology can operate are defined in Release 15 of the Third Generation Partnership Project (3GPP) as New Radio (NR) Frequency Range 1 (FR1), as shown in Table 1.

TABLE 1

5G operating bands for FR1

| NR Operating Band | Frequency Band (MHz) | Duplex Mode |
|---|---|---|
| n1 | 1920-1980; 2110-2170 | FDD |
| n2 | 1850-1910; 1930-1990 | FDD |
| n3 | 1710-1785; 1805-1880 | FDD |
| n5 | 824-849; 869-894 | FDD |
| n7 | 2500-2570; 2620-2690 | FDD |
| n8 | 880-915; 925-960 | FDD |
| n20 | 791-821; 832-862 | FDD |
| n28 | 703-748; 758-803 | FDD |
| n38 | 2570-2620 | TDD |
| n41 | 2496-2690 | TDD |
| n50 | 1432-1517 | TDD |
| n51 | 1427-1432 | TDD |
| n66 | 1710-1780; 2110-2200 | FDD |
| n70 | 1695-1710; 1995-2020 | FDD |
| n71 | 617-652; 663-698 | FDD |
| n74 | 1427-1470; 1475-1518 | FDD |
| n75 | 1432-1517 | SDL |
| n76 | 1427-1432 | SDL |
| n78 | 3300-3800 | TDD |
| n77 | 3300-4200 | TDD |
| n79 | 4400-5000 | TDD |
| n80 | 1710-1785 | SUL |
| n81 | 880-915 | SUL |
| n82 | 832-862 | SUL |
| n83 | 703-748 | SUL |
| n84 | 1920-1980 | SUL |

Further, details of a number of frequency bands (e.g., above 6 GHz) in which the 5G technology can operate are defined in Release 15 of the 3GPP as NR Frequency Range 2 (FR2), as shown in Table 2.

TABLE 2

5G operating bands for FR2

| NR Operating Band | FREQUENCY BAND (MHz) | Duplex Mode |
|---|---|---|
| n257 | 26500-29500 | TDD |
| n258 | 24250-27500 | TDD |
| n260 | 37000-40000 | TDD |

In some embodiments, a number of frequency bands in which a communication technology (e.g., device-to-device communication technology and/or cellular telecommunication technology using 5G technology) utilized for the communication 106 may be operable can further include the THF band in addition to those frequency bands such as the SHF, UHF, and EHF bands. The memory, transceiver, and/or the processor described herein may be a resource that can be wirelessly utilizable via respective communication technologies such as 5G technology.

As used herein, FDD stands for frequency division duplex, TDD stands for time division duplex, SUL stands for supplementary uplink, and SDL stands for supplementary downlink. FDD and TDD are each a particular type of a duplex communication system. As used herein, a duplex communication system refers to a point-to point system having two connected parties and/or devices that can communicate with one another in both directions. TDD refers to duplex communication links where uplink is separated from downlink by the allocation of different time slots in the same frequency band. FDD refers to a duplex communication system, in which a transmitter and receiver operate at different frequency bands. SUL/SDL refer to a point-to-point communication system having two connected parties and/or devices that can communicate with one another in a unilateral direction (e.g., either via an uplink or a downlink, but not both).

The 5G technology may be selectively operable in one or more of low, medium, and/or high 5G frequency bands based on characteristics of, for example, the communication. As an example, the low 5G frequency may be utilized in some use cases (e.g., enhanced mobile broadband (eMBB), ultra-reliable and low-latency communications (URLLC), massive machine-type communications (mMTC)), in which extremely wide area needs to be covered by the 5G technology. As an example, the medium 5G frequency may be utilized in some use cases (e.g., eMBB, URLLC, mMTC), in which higher data rate than that of the low 5G frequencies is desired for the communication technology. As an example, the high 5G frequency may be utilized in some use cases (e.g., eMBB), in which extremely high data rate is desired for the 5G technology.

As used herein, eMBB, URLLC, mMTC each refers to one of three categories of which the ITU has defined as services that the 5G technology can provide. As defined by the ITU, eMBB aims to meet the people's demand for an increasingly digital lifestyle and focuses on services that have high requirements for bandwidth, such as high definition (HD) videos, virtual reality (VR), and augmented reality (AR). As defined by the ITU, URLLC aims to meet expectations for the demanding digital industry and focuses on latency-sensitive services, such as assisted and automated driving, and remote management. As defined by the ITU, mMTC aims to meet demands for a further developed digital society and focuses on services that include high requirements for connection density, such as smart city and smart agriculture.

As used herein, a channel bandwidth refers to a frequency range occupied by data and/or instructions when being transmitted (e.g., by an individual carrier) over a particular frequency band. As an example, a channel bandwidth of 100 MHz may indicate a frequency range from 3700 MHZ to 3800 MHZ, which can be occupied by data and/or instructions when being transmitted over n77 frequency band, as shown in Table 1. As indicated in Release 15 of the 3GPP, a number of different channel bandwidth such as a channel bandwidth equal to or greater than 50 MHz (e.g., 50 MHz, 100 MHz, 200 MHz, and/or 400 Mhz) may be utilized for the 5G technology.

Embodiments are not limited to a particular communication technology; however, various types of communication technologies may be employed for the communication. The various types of communication technologies of the wirelessly utilizable resources (e.g., wirelessly utilizable resource 200-1, . . . , 200-5 in FIG. 2) can utilize may include, for example, cellular telecommunication technology including 0-5 generations broadband cellular network technologies, device-to-device to communication including Bluetooth, Zigbee, and/or 5G, and/or other wireless communication utilizing an intermediary device (e.g., WiFi utilizing an AP), although embodiments are not so limited.

FIG. 2 is a block diagram of examples of a system including wirelessly utilizable resources in accordance with a number of embodiments of the present disclosure. As illustrated in FIG. 2, the system 223 may, in a number of embodiments, include a plurality of elements. For example, the plurality of elements of the system 223 may be a number of wirelessly utilizable resources 200-1, . . . , 200-5 (collectively referred to as wirelessly utilizable resources 200) and/or a base station 225. At least a portion of the wirelessly utilizable resources 200 may include a local commodity DRAM and may utilize the resources of the wirelessly utilizable resource 200-1 as supplemental resources. The wirelessly utilizable resource 200-1 includes resources (e.g., a memory resource, a transceiver, and/or a processor) at least of which can be wirelessly utilizable (e.g., shared) by the wirelessly utilizable resources 200.

The wirelessly utilizable resources 200 can be various user devices. As an example, the wirelessly utilizable resources 200 can be computing devices such as laptops, phones, tablets, desktops, wearable smart devices, etc. In some embodiments, the user devices may be mobile as well. As used herein, a "mobile user device" may be a device that is portable and utilizes a portable power supply. In a number of embodiments, the wirelessly utilizable resources 200 can include a local DRAM and a memory resource that can be included in the wirelessly utilizable resource 200-1 and utilizable by the wirelessly utilizable resources 200 and may be supplemental to the wirelessly utilizable resources 200.

The wirelessly utilizable resource 200-1 including a wirelessly utilizable resource can be a wireless electronic component of at least one of the wirelessly utilizable resources 200. As used herein, "an electronic component" refers to an electronic component that can provide additional functions to a network device and/or assist the network device in furthering a particular function. For example, an electronic component may include various types of components (e.g., expansion card) such as a video card, sound card, primary storage devices (e.g., main memory), and/or secondary (auxiliary) storage devices (e.g., flash memory, optical discs, magnetic disk, and/or magnetic tapes), although embodiments are not so limited. As used herein, "a wireless electronic component" refers to an electronic component that is wirelessly coupled to a network device.

Accordingly, as an example, the wirelessly utilizable resource 200-1 may be wirelessly utilized by the wirelessly utilizable resources 200 for various functions. As an example, the wirelessly utilizable resource 200-1 may be utilized for graphical operations that would require high-performance processing and/or memory resources such as memory intensive games and/or high quality video associated with a high degree of resolutions and/or frame rates. Further, as an example, the wirelessly utilizable resource 200-1 may be utilized for non-graphical operations such as a number of operations of applications associated with machine-learning algorithms that would require high-performance processing and/or memory resources.

In some embodiments, at least a portion of the wirelessly utilizable resources 200 may be a small form factor (SFF) device such as a handheld computing device (e.g., personal computer (PC)). A degree of performance that can be often provided by the SSF device can be relatively low due to its limited size and volume. Further, the SSF device may lack a number of channels by which expansion cards such as a high-performance video card can be added. Accordingly, providing a mechanism to wirelessly add a high-performance video card such as the wirelessly utilizable resource 200-1 to the SSF device can provide benefits such as performing, at the SSF device, memory-intensive operations (e.g., memory intensive games and/or high quality video associated with a high degree of resolutions and/or frame rates), which would have not been properly performed at the SSF device absent the wirelessly utilizable resources.

In a number of embodiments, the wirelessly utilizable resource 200-1 may be wirelessly utilized via a device-to-device communication technology, for example, by the wirelessly utilizable resources 200 as shown in FIG. 2. For example, as illustrated in connection with FIG. 1, the device-to-device communication technology can operate in higher frequency portion of the wireless spectrum, including an UHF, SHF, EHF and/or THF band, as defined according to the ITU. However, embodiments are not so limited. For example, other network communication technologies of a device-to-device communication technology may be employed within the system 223. As an example, the wirelessly utilizable resource 200-1 may communicate with at least one of the wirelessly utilizable resources 200 via a different type of device-to-device communication technology such as a Bluetooth, Zigbee, and/or other types of device-to-device communication technologies.

As shown in FIG. 2, the wirelessly utilizable resource 200-1 may be wirelessly utilized by the wirelessly utilizable resources 200 via the base station 225. As an example, a communication technology that can be utilized between the wirelessly utilizable resources 200-4 and the wirelessly utilizable resource 200-1 may be a cellular telecommunication technology. In a number of embodiments, the cellular telecommunication technology that can be utilized for communicating between the wirelessly utilizable resource 200-4 and the wirelessly utilizable resource 200-1 can include a 5G cellular telecommunication technology that operates in at least one of a number of frequency bands including the UHF, SHF, EHF, and/or THF.

The term "base station" may be used in the context of mobile telephony, wireless computer networking and/or other wireless communications. As an example, a base station 225 may include a GPS receiver at a known position, while in wireless communications it may include a transceiver connecting a number of other devices to one another and/or to a wider area. As an example, in mobile telephony, a base station 225 may provide a connection between mobile phones and the wider telephone network. As an example, in a computing network, a base station 225 may include a transceiver acting as a router for electrical components (e.g., memory resource 101 and processing resource 108 in FIG. 1) in a network, possibly connecting them to a WAN, WLAN, the Internet, and/or the cloud. For wireless networking, a base station 225 may include a radio transceiver that may serve as a hub of a local wireless network. As an example, a base station 225 also may be a gateway between a wired network and the wireless network. As an example, a base station 225 may be a wireless communications station installed at a fixed location.

In a number of embodiments, the wirelessly utilizable resource 200-1 may utilize the same network protocol and same transceiver (e.g., RF transceiver) for a device-to-device communication technology (e.g., 5G device-to-device communication technology) as well as a cellular telecommunication technology (e.g., 5G cellular telecommunication technology), as described in connection with FIG. 1. As an example, the wirelessly utilizable resource 200-1 may utilize the same network protocol in communicating with the wirelessly utilizable resource 200-4 (e.g., via a cellular telecommunication technology through the base station 225) as well as with the wirelessly utilizable resources 200 (e.g., via a device-to-device communication technology).

In a number of embodiments, various types of network protocols may be utilized for communicating data within the system 223 (e.g., among the wirelessly utilizable resources 200, between the wirelessly utilizable resources 200, between the wirelessly utilizable resources 200 and the base station 225, etc.). The various types of network protocols may include the time-division multiple access (TDMA), code-division multiple access (CDMA), space-division multiple access (SDMA), frequency division multiple access (FDMA), orthogonal FDMA (OFDMA), single-carrier (SC)-FDMA, and/or non-orthogonal multiple access (NOMA), although embodiments are not so limited.

In some embodiments, cellular telecommunication technologies (e.g., between the wirelessly utilizable resource 200-1 and the wirelessly utilizable resource 200-4) may be performed via (e.g., include) a NOMA. As used herein, the NOMA refers to a network protocol that separates signals according to a power domain. For example, signals may be received (e.g., from the user) in an intentionally-introduced mutual interference and can be separated from each other according to differences on their power levels. As such, the signals received and to be processed pursuant to the NOMA may be non-orthogonal in time, frequency, and/or code, as compared to those orthogonal multiple-access (OMA) schemes, in which different users are allocated according to orthogonal resources, either in time, frequency, and/or code domain. Accordingly, utilizing a non-orthogonal network protocols such as the NOMA may provide benefits such as reduced latencies associated with separating users based on factors other than power domain, which may enable massive Multiple Input Multiple Output (MIMO).

In a number of embodiments, the wirelessly utilizable resource 200-1 may be utilized by the wirelessly utilizable resources 200 at a discrete time. For example, the wirelessly utilizable resource 200-1 may be utilized by the wirelessly utilizable resource 200-3 during a subsequent period of a particular period during which the wirelessly utilizable resource 200-1 was, for example, utilized by the wirelessly utilizable resource 200-2. As such, the wirelessly utilizable resource 200-1 may be utilized by each of the wirelessly utilizable resources 200 at different times (e.g., non-overlapping time periods). However, embodiments are not so limited. For example, the wirelessly utilizable resource 200-1 may be simultaneously utilized by the wirelessly utilizable resources 200. As an example, the wirelessly utilizable resource 200-1 may be physically and/or logically partitioned such that the partitioned portions may be simultaneously utilized by the wirelessly utilizable resources FIG. 3 is a block diagram of examples of a network 330 for wirelessly coupling selected wirelessly utilizable resources for formation of a memory pool in accordance with a number of embodiments of the present disclosure. The network 330 may, in a number of embodiments, include a plurality of elements (e.g., two or more vehicles) that may be included in a memory pool, as described herein.

Figure 3:
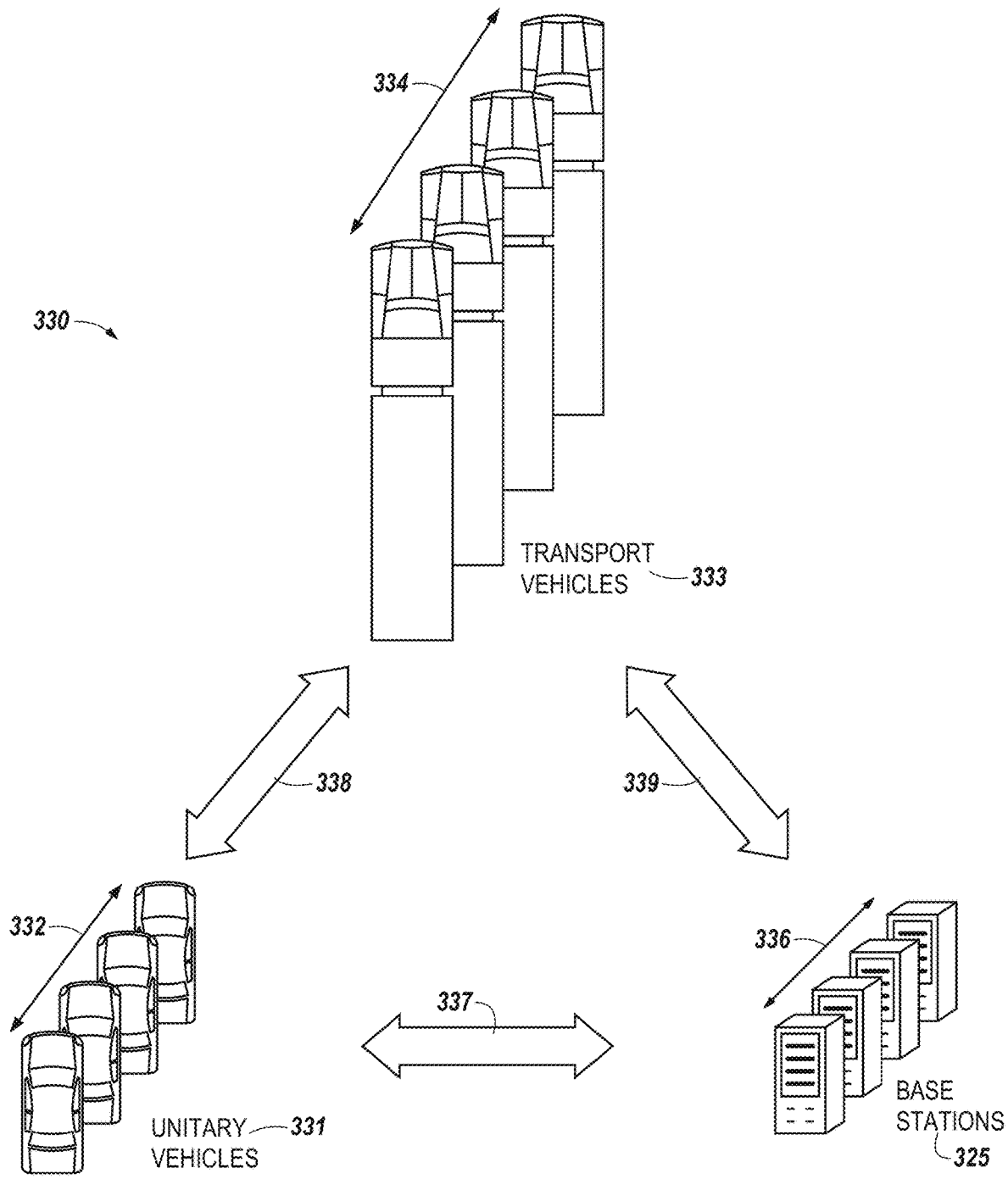
FIG. 3 is a block diagram of examples of a network for wirelessly coupling selected wirelessly utilizable resources for formation of a memory pool in accordance with a number of embodiments of the present disclosure.

As illustrated in FIG. 3, the elements that may potentially be included in the network 330 may, in a number of embodiments, be a number of unitary vehicles 331 and/or transport vehicles 333. In some embodiments the network 330 may potentially include a number of base stations 325.

A unitary vehicle 331, as described herein, is intended to mean a vehicle that may be owned, leased, rented, or borrowed to enable travel from an origin to an intended destination, or vice versa. The unitary vehicle 331 may be driven or directed to travel by a person (e.g., a driver) and/or autonomously (e.g., via a memory resource coupled to a processing resource, as described herein). The travel may be by the unitary vehicle 331 and a number of passengers (e.g., the driver and/or a number of other persons) or the vehicle itself acting as an autonomous vehicle. Examples of a unitary vehicle 331 may include: an automobile (e.g., a car, pickup truck, mini-van, personally-operated truck and/or van, sports utility vehicle, etc.); a motorcycle; taxi cab; bus; a limousine; airplane; helicopter; aerial drone; watercraft (e.g., a privately owned and/or commercial boat or ship operable in a port environment and/or shipping lanes), jet-ski, submarine, locomotive (e.g., connected to a number of railway cars) operable on a track; and mobile equipment (e.g., a manually-driven or autonomous pallet jack, bin, cart, etc.) operated within and/or outside a commercial or industrial facility; among many other such possibilities.

A transport vehicle 333, as described herein, is intended to mean a vehicle that may be owned, leased, rented, or borrowed to enable transport of goods and/or services (e.g., shipment of a commercially provided product or products) from an origin to an intended destination, or vice versa. The transport vehicle 333 may be driven or directed to travel by a person (e.g., a driver) and/or autonomously (e.g., via a memory resource coupled to a processing resource, as described herein). The travel may be by the transport vehicle 333 and a number of passengers (e.g., the driver and/or a number of other persons), which also may include the transported product or products (e.g., in a load bed of the transport vehicle 333) or the transport vehicle itself acting as an autonomous vehicle. Examples of a transport vehicle 333 may include: a commercially-operated truck and/or van; a sequence of trucks and/or vans operable as an automotive train, fleet, and/or convoy (e.g., on or in a designated lane on a road, highway, interstate, etc.); a sequence of commercially-operated boats and/or ships operable in a port environment and/or shipping lanes; a sequence of commercially-operated aerial drones operable on or in a designated airstrip, runway, and/or flight path; among many other such possibilities.

A base station 325, as also shown at 225 and described in connection with FIG. 2 and elsewhere herein, is intended to mean a land station in a mobile service (e.g., according to International Telecommunication Union's (ITU) Radio Regulations). The term may be used in the context of mobile telephony, wireless computer networking and other wireless communications, and/or in land surveying. A base station 325 may include a GPS receiver at a known position, while in wireless communications it may include a transceiver connecting a number of other devices to one another and/or to a wider area. In mobile telephony, a base station 325 may provide a connection between mobile phones and the wider telephone network. In a computing network, a base station 325 may include a transceiver acting as a router for compute components (e.g., memory resources 101 and processing resources 108) in a network (e.g., a memory pool), possibly connecting them to a WAN, WLAN, the Internet, and/or the cloud. For wireless networking, a base station 325 may include a radio transceiver that may serve as a hub of a local wireless network. A base station 325 also may be a gateway between a wired network and the wireless network. A base station 325 may be a wireless communications station installed at a fixed location.

In a geographical area with a relatively low density of memory resources 101, processing resources 108, and/or transceiver resources 120 (e.g., rural areas relative to urban areas, as described in connection with FIG. 4), the low density may reduce likelihood of construction of a new base station (e.g., by making such construction commercially nonviable, among other possible reasons). As a result, wireless communication to enable formation of a memory pool may be enabled by installing a repeater. A repeater is a type of base station that extends the range of mobile radio transceivers (e.g., that wirelessly communicate via transceiver resources 120). A repeater may include a bidirectional amplifier used to improve reception of wireless signals. A repeater system also may include an antenna that receives and transmits signal from, for example, base stations, cell towers, coaxial cables, etc., via a signal amplifier and/or a rebroadcast antenna. Some rural, suburban, and/or urban environments, however, may include a plurality of base stations within a particular area (e.g., as determined by a reception/transmission ranges of cell towers and/or possible obstruction of the same by infrastructure, such as buildings, etc.).

Hence, in a number of embodiments, the network 330 illustrated in FIG. 3 may enable wireless sharing of data by formation of a memory pool between a plurality 332 of the unitary vehicles 331, a plurality 334 of transport vehicles 333, and/or a plurality 336 of base stations 325. Alternatively or in addition, in a number of embodiments, the network 330 may enable wireless sharing of data by formation of a memory pool between 338 at least one of the plurality 332 of the unitary vehicles 331 and at least one of the plurality 334 of the transport vehicles 333. The network 330 also may enable wireless sharing of data by formation of a memory pool between 337 at least one of the plurality 332 of the unitary vehicles 331 and at least one of the plurality 336 of the base stations 325 and/or a memory pool between 339 at least one of the plurality 332 of the transport vehicles 333 and at least one of the plurality 336 of the base stations 325. Alternatively or in addition, in a number of embodiments, a memory pool may be formed between at least one of the plurality 332 of the unitary vehicles 331 and/or at least one of the plurality 334 of the transport vehicles 333 and infrastructure (e.g., houses, police/fire/news stations, businesses, factories, etc., as shown at 444, 445, 446) that includes memory resources 201, processing resources 208, and/or transceiver resources 220 as described herein.

Accordingly, as described herein, a wirelessly utilizable resource (e.g., 200-1) of a system may include a first memory resource (e.g., 201-1), a first processing resource (e.g., 208-1) coupled to the first memory resource, and a wireless base station 325) coupled to the first processor. The first memory resource 201-1, the first processing resource 208-1, and the base station 325 may be configured to enable formation of a memory pool to share data between the first memory resource and a second memory resource (e.g., 201-4) at a vehicle (e.g., at least one of the plurality of unitary vehicles 331 and or the plurality of transport vehicles 333) responsive to a request to access the second memory resource 201-4 from the first processing resource 208-1 transmitted via the base station 325. Data shared by the second memory resource 201-4 may have been previously determined (by a controller 110 of the wirelessly utilizable resource 200-1) to enable performance of a particular functionality, stored by the first memory resource 201-1, as at least part of a mission profile (e.g., as shown at 117 and described in connection with FIG. 1) for transit of the vehicle.

The controller 110 (e.g., a first controller 110-1 (not shown)) of the wirelessly utilizable resource 200-1 may be coupled to the first processing resource 208-1. The first controller 110-1 may be configured to selectably determine the particular functionality for which data is to be shared by the second memory resource 201-4 with the first memory resource 201-1 to direct performance of an operation of the particular functionality that is different from an operation performed based on data values previously stored by the first memory resource 201-1.

The system may include a controller (e.g., a second controller 110-2 (not shown)) coupled to a second processing resource 208-4 coupled to the second memory resource 201-4 of a second wirelessly utilizable resource 200-4 positioned and/or formed on the vehicle. The second controller 110-2 may be configured to selectably determine a particular memory device (e.g., selected from memory devices 103-1, . . . , 103-N) of the second memory resource 201-4 from which data requested, via the base station 325, for performance of the particular functionality is to be transmitted by the second processing resource 208-4. The system may further include a transceiver resource (e.g., as shown at 120 and described in connection with FIG. 1) including a first RF transceiver 220-1 coupled to the first processing resource 208-1 and a second RF transceiver 220-4 coupled to the second processing resource 208-4 to enable formation of the memory pool between the first memory resource 201-1 and the second memory resource 201-4.

The second controller 110-2 may be further configured to selectably determine, responsive to prioritization of data requested by the first memory resource 201-1, a particular memory device 103 of the second memory resource 201-4 to be accessed for the data to be transmitted to the first memory resource 201-1. The prioritization may be determined, for example, based on a pending request for data (e.g., information) regarding a mission profile received from one or more vehicles. Performance of an operation by the first processing resource 208-1 coupled to the first memory resource 201-1 may be enabled based on processing of data values shared by a second processing resource 208-4 coupled to the second memory resource 201-1, where the data values shared by the second processing resource 208-4 include at least one data value different from data values previously stored by the first memory resource 201-1. Storage of the at least one different data value may enable the performance of an operation that is different based on processing of code including the at least one different data value relative to performance of an operation based upon processing of the code prior to the at least one different data value being stored.

In a number of embodiments, a first memory resource 201-2 positioned and/or formed on a first vehicle, a first processing resource 208-2 coupled to the first memory resource 201-2, and a transceiver resource 120-2 coupled to the first processing resource 108-2 may be configured to enable formation of a memory pool between the first memory resource 201-2 and a second memory resource 201-3 positioned and/or formed on a second vehicle responsive to a request to access the second memory resource 201-3 (e.g., the request received from the first processing resource 208-2). A first controller 110-2 may be coupled to the first processing resource 201-2. The first controller 110-2 may, in a number of embodiments, be configured to selectably determine a particular functionality, as described herein, for which data is to be shared by the first memory resource 201-2 with the second memory resource 201-3 to direct performance of an operation of the particular functionality that is different from an operation performed based upon data values previously stored by the second memory resource 201-3. A second controller 110-3 coupled to a second processing resource 108-3 may be coupled to the second memory resource 201-3 and may be configured to selectably determine a particular memory device (e.g., determined from memory devices 103-1, . . . , 103-N) of the second memory resource 201-3 to which data received, via the transceiver resource 120-2, from the first memory resource 201-2 for performance of a particular functionality is to be stored by the second memory resource 201-3.

For example, a request from the first processing resource 208-2 (e.g., positioned and/or formed on a first vehicle) for the access to the second memory resource 201-3 may be prioritized by a second vehicle such that the second processing resource 208-3 coupled to the second memory resource 201-3 processes the data received from the first memory resource 201-2 to enable, in a number of embodiments, direction of transit of the second vehicle before a response may be provided to a request for data that is received from a first processing resource 208-2 coupled to the first memory resource 201-2. The second controller 110-3 may be further configured to selectably determine, responsive to prioritization of data received from the first memory resource 201-2, a particular memory device 103 of the second memory resource 201-3 for storage of the data transmitted via the transceiver resource 120-2.

The first memory resource 201-2 coupled to the first processing resource 208-2 may be configured to share data between the first memory resource 201-2 and the second memory resource 201-3. The first memory resource 201-2, the second memory resource 201-3, and the transceiver resource 220 may be configured to enable performance of an operation directed by the first processing resource 208-2 based upon processing of the data shared between the first memory resource 201-2 and the second memory resource 201-3. The performance of the operation by the second processing resource 208-3 coupled to the second memory resource 201-3 may be enabled based upon processing of data values shared by the first processing resource 208-2 coupled to the first memory resource 201-2. The data values shared by the first processing resource 208-2 may, in a number of embodiments, include at least one data value different from data values previously stored by the second memory resource 201-3. Storage of the at least one different data value may enable performance of an operation that is different based on processing of code including the at least one different data value relative to performance of an operation based upon processing of the code prior to the at least one different data value being stored.

The transceiver resource 120 described herein may, in a number of embodiments, include a first RF transceiver (e.g., as shown at 663 and described in connection with FIG. 6) coupled, for example, to the first processing resource 208-1 and a second RF transceiver coupled to a second processing resource 208-2 to enable formation of the memory pool between the first memory resource 201-1 and the second memory resource 201-2. The transceiver resource 120 may be wirelessly couplable to a cloud processing resource 122, as described herein in connection with FIG. 1, to enable formation of the memory pool.

In a number of embodiments, as described herein, the first memory resource 201-1 and the first processing resource 208-1 may be associated and/or part of (e.g., coupled to) the base station 325 and the second memory resource 201-4 and the second processing resource 208-4 may be at (e.g., positioned and/or formed on) a vehicle. Alternatively or in addition, in a number of embodiments, the first memory resource 201-2 and the first processing resource 208-2 may be at a first vehicle and the second memory resource 201-3 and the second processing resource 208-3 may be at another (e.g., a second) vehicle. The data shared by the first memory resource and the second memory resource in either embodiment may enable direction of transit to an intended destination by the first vehicle (e.g., an autonomous unitary or transport vehicle) or the second vehicle (e.g., another autonomous unitary or transport vehicle). The transit may be directed (e.g., by controller 110) to include performance of at least one operation by the first vehicle or the second vehicle that is different from an operation performed based upon data values previously stored by the respective first memory resource or second memory resource.

Figure 4:
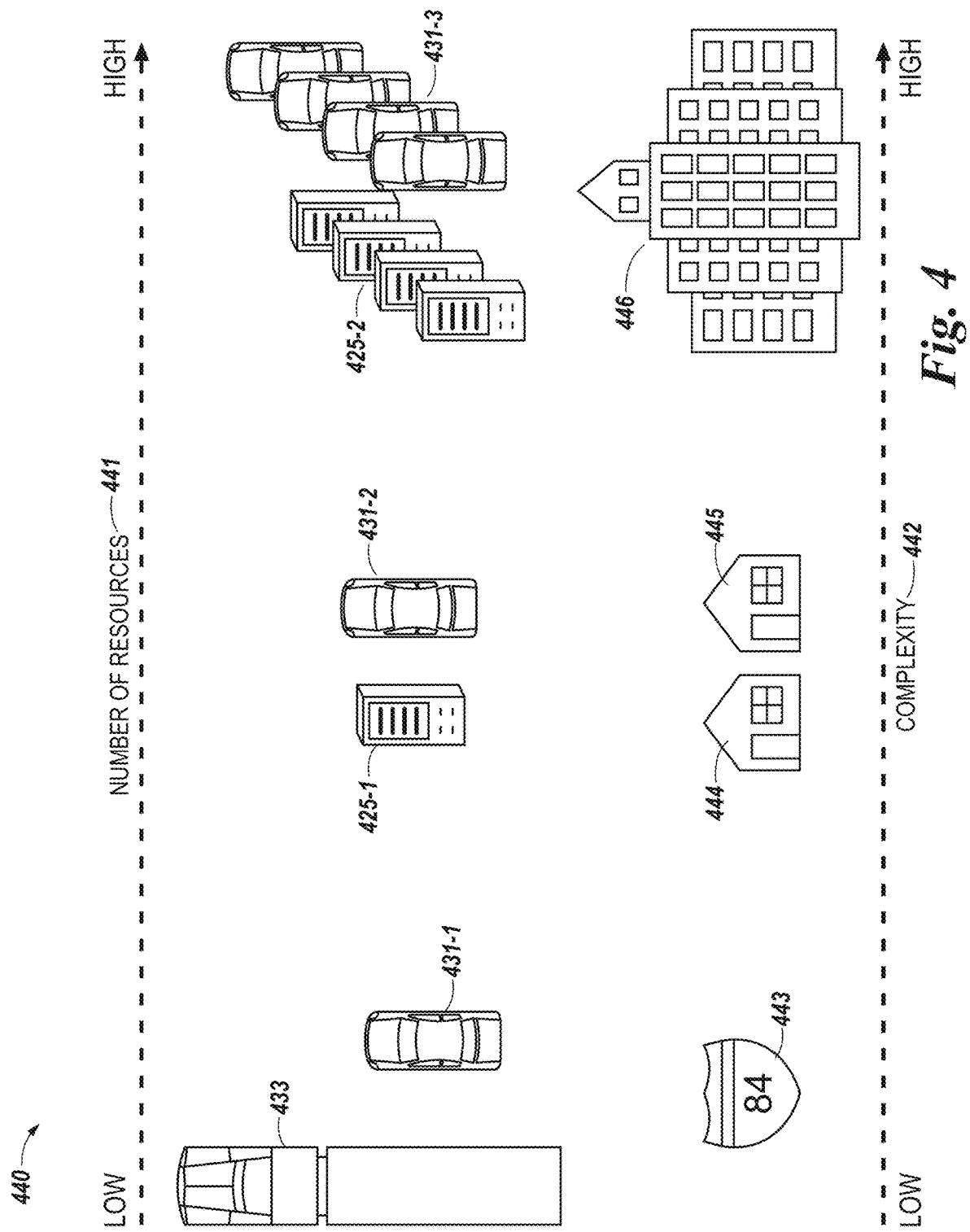
FIG. 4 is a block diagram illustrating an example of environments that correspond to a range of densities of wirelessly utilizable resources couplable for formation of a memory pool in accordance with a number of embodiments of the present disclosure.

FIG. 4 is a block diagram illustrating an example of environments that correspond to a range of densities of wirelessly utilizable resources couplable for formation of a memory pool in accordance with a number of embodiments of the present disclosure. The range of densities 440 of resources may, in a number of embodiments, correspond to a "low" density of such resources, as shown at or near the left side of FIG. 4, through a "high" density of such resources, as shown at or near the right side.

A density range 440 of such resources may correspond to a number of resources 441 located (e.g., fixedly and/or movably at a particular point in time and/or in a particular time period) within a particular area (e.g., geographically defined and/or defined by base station, cell tower, cloud coverage, among other possibilities for defining the area). The density of resources 440 and/or the number of resources 441 in a particular area may, in a number of embodiments, contribute to determination of a size of a memory pool between a plurality of such resources that are coupled to wirelessly share data. For example, a low density of such resources may enable formation of a memory pool that includes fewer such resources than may be included in a memory pool formed where there is a high density of such resources, with the memory pool potentially including an intermediate number of such resources where the density 440 is between low and high.

The number of resources 441 in a particular area may correspond to a number of memory resources 101, processing resources 108, transceiver resources 120, and/or base stations 425 within the particular area. The number of resources 441 may be formed and/or positioned on, in a number of embodiments, a corresponding number of unitary vehicles 431, transport vehicles 433, base stations 425, and/or infrastructure (e.g., houses 444, police/fire/news stations, and/or businesses 445, factories and/or corporate offices, etc., 446) located within the area and/or within a proximity of an intended route or potential alternative routes to be transited by the unitary vehicles 431 and/or transport vehicles 433. An increasing density 440, an increasing number of such resources 441, and/or an increasing number of different types of such resources (e.g., a mixture of unitary vehicles 431, transport vehicles 433, number of base stations 425, and/or infrastructure 444, 445, 446) within an area may correspond to an increasing complexity 442 of such resources in the area.

An area having a low density 440, number 441, and/or complexity 442 of resources may, for example, be a rural area, as shown at or near the left side of FIG. 4. Such a rural area may include a number of routes of transit 443 (e.g., widely separated interstate freeways, state and/or county highways, etc.) that may correspond to potential intended routes of transit for unitary vehicles 431 and/or transport vehicles 433. Such a rural area may, at a particular time point and/or in a particular time period, have as few as two unitary vehicles 431-1 or as few as two transport vehicles 433 and/or as few as one unitary vehicle 431-1 and one transport vehicle 433 to form a memory pool. In some situations, such a rural area and/or a portion of the routes of transit 443 may or may not include a base station and/or infrastructure to contribute to formation of the memory pool. Accordingly, the memory pool may be formed via direct wireless coupling between processing resources of the unitary vehicles 431 and/or transport vehicles 433.

An area having an intermediate density 440, number 441, and/or complexity 442 of resources may, for example, be a suburban area, as shown at or near the middle of FIG. 4. Such a suburban area may potentially include the routes of transit 443 for unitary vehicles 431 and/or transport vehicles 433 present in the rural areas. Such a suburban area, at a particular time point and/or in a particular time period, may be more likely to have at least two unitary vehicles 431-2 to form a memory pool. The suburban area may or may not include any transport vehicles 433 at a particular time point and/or in a particular time period. Such a suburban area may be more likely to include at least one base station 425-1 and/or infrastructure 444, 445 to contribute to formation of the memory pool. Accordingly, the memory pool may be formed via direct or indirect wireless coupling between processing resources of the unitary vehicles 431-2 and/or transport vehicles 433. In a number of embodiments, the memory pool may be formed between the processing resources of the unitary vehicles 431 and/or transport vehicles 433 by indirect wireless coupling via the base station 425-1 and/or the infrastructure 444, 445.

An area having a high density 440, number 441, and/or complexity 442 of resources may, for example, be an urban area, as shown at or near the right side of FIG. 4. Such an urban area may potentially include the routes of transit 443 for unitary vehicles 431 and/or transport vehicles 433 present in the rural and/or suburban areas. Such an urban area, at a particular time point and/or in a particular time period, may be more likely to have more than two unitary vehicles 431-3 to form a memory pool. The urban area may or may not include any transport vehicles 433 at a particular time point and/or in a particular time period. Such an urban area may be more likely to include more than one base station 425-2 and/or infrastructure 446 (e.g., in addition to infrastructure 444, 445) to contribute to formation of the memory pool. Accordingly, the memory pool may be formed via direct wireless coupling between processing resources of the unitary vehicles 431-3 and/or transport vehicles 433. In a number of embodiments, the memory pool may be formed between the processing resources of the unitary vehicles 431 and/or transport vehicles 433 by indirect wireless coupling via the base stations 425-2 and/or the infrastructure 444, 445, 446.

Figure 5:
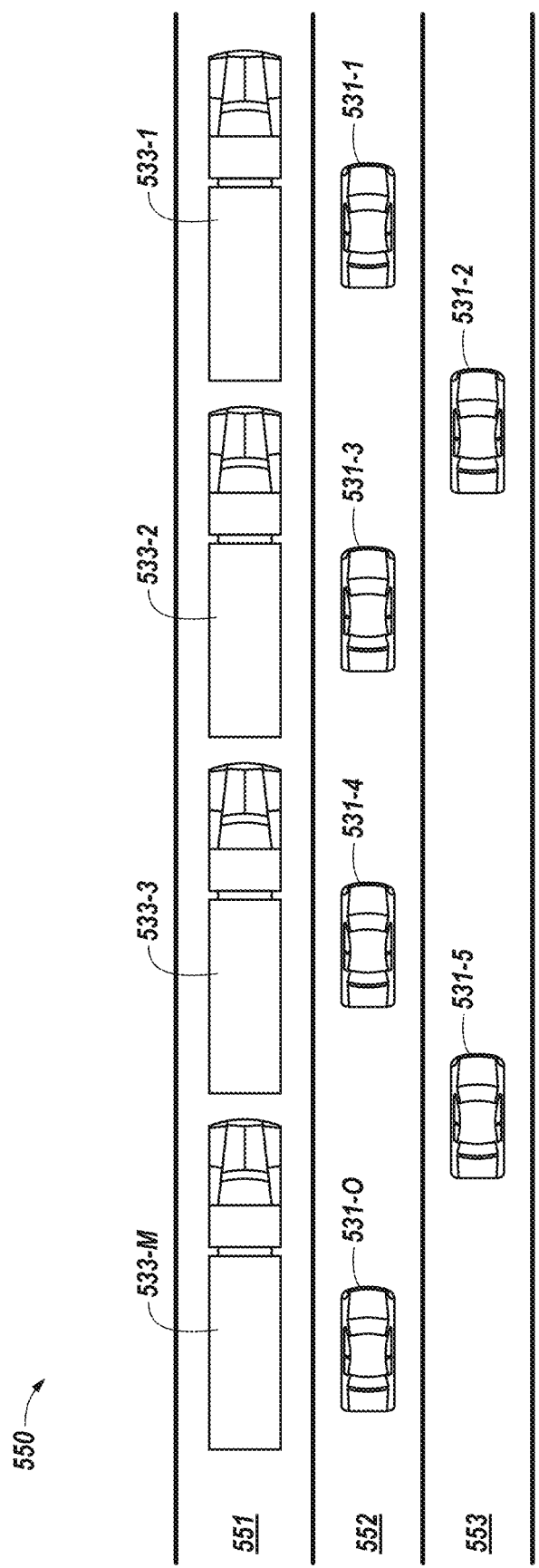
FIG. 5 is a block diagram illustrating an example of a route for vehicles upon which the resources may be implemented for formation of a memory pool in accordance with a number of embodiments of the present disclosure.

FIG. 5 is a block diagram illustrating an example of a route for vehicles upon which the wirelessly utilizable resources may be implemented for formation of a memory pool in accordance with a number of embodiments of the present disclosure. The route 550 may, in a number of embodiments, represent an intended route upon which the vehicles are transiting toward an intended destination. The intended destination may vary dependent upon the individual vehicle being considered. The route 550 may be a road, street, highway, interstate, etc., in a rural, suburban, and/or urban area (e.g., as described in connection with FIG. 4).

The route 550 may be utilized for transit of, at a particular time and/or in a particular time period, a number of transport vehicles (e.g., as shown at 533-1, 533-2, . . . , 533-M) and/or a number of unitary vehicles (e.g., as shown at 531-1, 531-2, . . . , 531-O). The route 550 or at least a portion 551 of the route (e.g., one or more lanes) may, in a number of embodiments, be designated for transit of a number of transport vehicles 533. For example, the portion 551 of the route 550 may be designated, or at least utilized, for a plurality of automated transport vehicles 533-1, 533-2, . . . , 533-M transiting in sequence (e.g., as a convoy) toward an intended destination, although at least some of the transport vehicles may continue on toward various other destinations after reaching the intended destination.

Alternatively or in addition, the route 550 or at least a portion 552, 553 of the route 550 (e.g., one or more lanes) may, in a number of embodiments, be designated for transit of a number of unitary vehicles 531. For example, the portion 552, 553 of the route 550 may be designated, or at least utilized, for automated unitary vehicles 531-1, 531-2, . . . , 531-O each transiting toward an intended destination, which may, in a number of embodiments, vary between each unitary vehicle. At least one portion 552 (e.g., lane) of the route 550 upon which the unitary vehicles 531 may transit may be adjacent (e.g., next to) a portion 551 designated for transit of transport vehicles 533. For example, a lane designated for transit of unitary vehicles may be positioned on each side of a lane or lanes designated for transit of transport vehicles. The portion shown at 553 may represent one or more lanes designated for transit of unitary vehicles 531 extending outward relative to the portion 552 adjacent the portion 551 designated for transit of transport vehicles 533.

In some embodiments, each portion 551 (e.g., lane) designated for transit of transport vehicles 533 may be wider than each portion 552, 553 (e.g., lane) designated for transit of unitary vehicles 531. In some embodiments, each portion 551 designated for transit of transport vehicles 533 and/or each portion 552, 553 designated for transit of unitary vehicles 531 may be equipped with sensors (e.g., that are configured to wirelessly communicate with processing resources 108 on the vehicles) to contribute to determining and/or tracking positions of the transport vehicles 533 and/or unitary vehicles and/or to verify that the transport vehicles 533 and/or unitary vehicles are transiting in the appropriate portions of the route 550.

Figure 6:
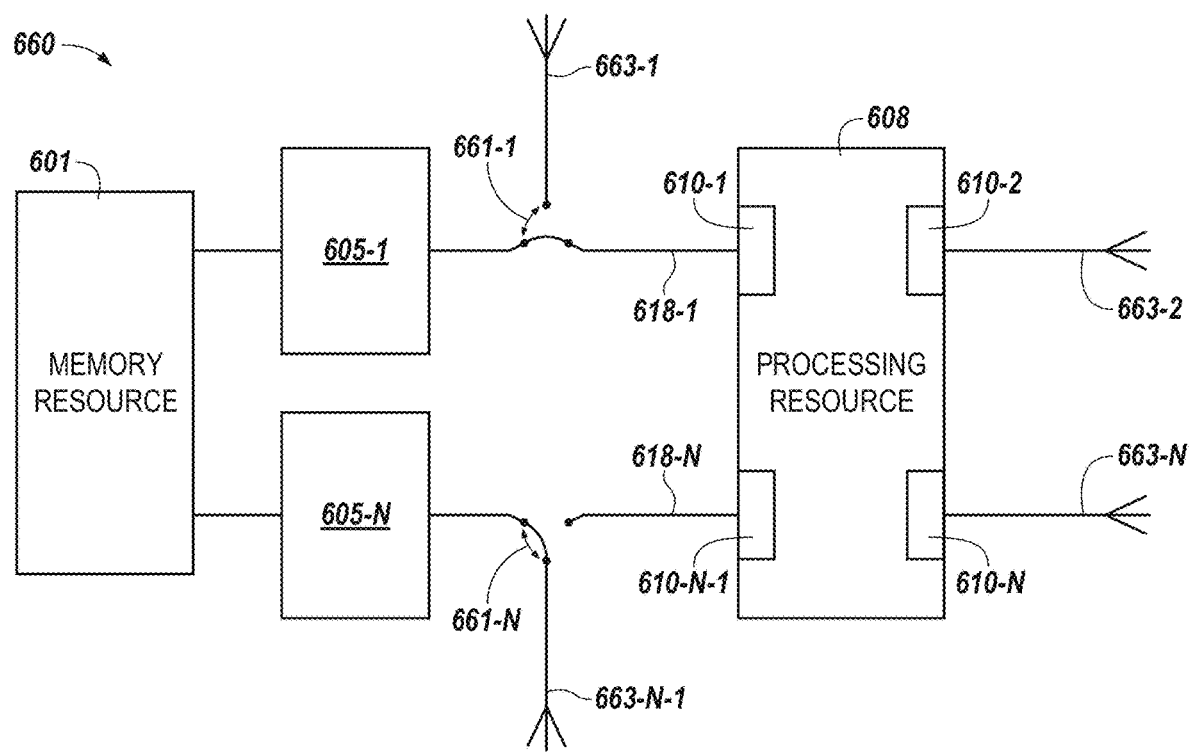
FIG. 6 is a schematic diagram illustrating an example of wirelessly utilizable resources selectably coupled to circuitry to enable formation of a memory pool in accordance with a number of embodiments of the present disclosure.

FIG. 6 is a schematic diagram illustrating an example of wirelessly utilizable resources selectably coupled to circuitry to enable formation of a memory pool in accordance with a number of embodiments of the present disclosure. The resources selectably coupled to the circuitry 660 illustrated in FIG. 6 include a processing resource 608 and channels 605-1, . . . , 605-N coupled to memory devices included in a memory resource (e.g., as shown at 103-1, . . . , 103-N and 101, respectively, in FIG. 1). The processing resource 608 is illustrated to include a controller 610. The controller 610 is illustrated as being formed from a plurality of sections (e.g., sections 610-1, 610-2, . . . , 610-N) for purposes of clarity in illustrating connections with the circuitry shown in FIG. 6, although the controller 610 may be formed as a single component (e.g., as shown in FIG. 1). As described further herein, the circuitry (e.g., as shown at 618 and/or 661) and/or the controller 610 may be coupled to a number of RF transceivers (e.g., as shown at 663-1, 663-2, . . . , 663-N) of the transceiver resource 120 to enable transmission of requests for and/or receipt of wirelessly shared data for formation of a memory pool. The resources just described each may, in a number of embodiments, be configured to perform at least a portion of the functions described in connection with FIGS. 1-5 and 7-8 in addition to those described in connection with FIG. 6.

Controller section 610-1 may be selectably coupled via I/O line 618-1 (e.g., of the bus 118 described in connection with FIG. 1) to the channel 605-1 to issue a command and/or an address from the processing resource 608 related to performance of a particular functionality to be directed to an appropriate one or more memory devices selectably coupled to the I/O line 618-1. The command and/or the address may enable retrieval via I/O line 618-1 of previously stored data from the appropriate memory devices and/or an appropriate number of rows of a memory device to enable performance of the particular functionality by the controller section 610-1.

In a number of embodiments, I/O line 618-1 may, via a command and/or an address, enable input of newly received data (e.g., received via formation of a memory pool between a first memory resource 201-1 and a second memory resource 201-2 by processing resource 608) to be stored by appropriate memory devices and/or appropriate rows of a memory device to enable improved performance of the particular functionality by the controller section 610-1. Alternatively or in addition, I/O line 618-1 may, via a command and/or an address, enable output of previously stored data (e.g., output via formation of a memory pool with second memory resource 201-2 by processing resource 608) from appropriate memory devices and/or appropriate rows of a memory device in response to a request for such data by another processing resource (e.g., second processing resource 208-2).

The particular command and/or address issued by the processing resource 608 via controller section 610-1 may selectably determine whether I/O line 618-1 is configured to enable the input of the newly received data or the output of the previously stored data versus being configured to enable retrieval of previously stored data to enable performance of the particular functionality by the controller section 610-1. As such, a first command and/or address issued via controller section 610-1 may direct that a switch 661-1 of the circuitry associated with I/O line 618-1 be opened to disconnect channel 605-1 from controller section 610-1 while connecting (e.g., coupling) a portion of the I/O line 618-1 that remains connected to channel 605-1 to RF transceiver 663-1 to enable the input of the newly received data or the output of the previously stored data. A second command and/or address issued via controller section 610-1 may direct that the switch 661-1 of the circuitry associated with I/O line 618-1 be closed to connect (e.g., couple) channel 605-1 with controller section 610-1, while disconnecting RF transceiver 663-1, to enable the retrieval of the previously stored data and enable the performance of the particular functionality by the controller section 610-1. Other controller sections, I/O lines, channels, switches, and/or RF transceivers (e.g., as shown at 610-N–1, 618-N, 505-N, 661-N, and/or 663-N–1, respectively) may operate similarly.

Accordingly, the processing resource 608, which includes controller sections 610-1, . . . , 610-N–1, may be selectably coupled to a plurality of switches 661-1, . . . , 661-N for a corresponding plurality of channels 605-1, . . . , 605-N of a memory resource. The controller sections may be configured to select, responsive to selective activation of a particular switch, which particular channel is enabled to transmit, via a RF transceiver 663-1, . . . , 663-N–1 selectably coupled to the particular channel, data stored in memory of the particular channel responsive to a request received from a second processing resource coupled to the second memory resource. The controller sections may be further configured to receive, via the RF transceiver selectably coupled to the particular channel, data from the second memory resource to be stored in the memory of the particular channel responsive to a request transmitted by the processing resource 608.

Controller section 610-2 of processing resource 608 may be selectably coupled to RF transceiver 663-2 to issue (e.g., transmit) a request to other processing resources (e.g., second processing resource 208-2) for formation of a memory pool to wirelessly share data. The request may, in a number of embodiments, be for data that corresponds to a particular functionality having data already stored by appropriate memory devices and/or appropriate rows of a memory device selectably coupled to channel 605-1. Upon receiving a response from at least one other processing resource (e.g., second processing resource 108-2) that such data is stored and/or is available at a particular address in a memory resource (e.g., second memory resource 201-2), the processing resource 608 may issue a command and/or address via controller section 610-2 for formation of the memory pool and/or access to the data to be wirelessly shared. Other controller sections and/or RF transceivers (e.g., as shown at 610-N and/or 663-N, respectively) may operate similarly.

In a number of embodiments, a first memory resource (e.g., memory resource 201-1) may be configured to wirelessly share data and a second memory resource (e.g., memory resource 201-2) may be configured to wirelessly share data. A combination component (e.g., as shown in FIG. 1 at 112 in controller 110) may be configured to assess resource availability of the first memory resource and the second memory resource to determine whether to enable a combination thereof to wirelessly share data. The availability of either the first memory resource or the second memory resource may be determinable based upon determination of a workload being performed at a particular point in time and/or in a particular time period by the first memory resource and/or the second memory resource.

For example, the first memory resource may be available at a particular point in time when the first memory resource and/or the corresponding processing resource is not being utilized for performing a particular operation (e.g., involved with forming a memory pool and/or enabling performance of a particular functionality). Similarly, the second memory resource may be available at a particular point in time when the second memory resource and/or the corresponding processing resource is not being utilized for performing a particular operation. The combination component 112 may be further configured to contribute to formation of the memory pool to share the data responsive to determination that the data stored by an available second memory resource 201-2 corresponds to data stored by an available first memory resource 201-1 (e.g., for the particular functionality).

The combination component 112 may, in a number of embodiments, be further configured to determine that data stored by an available first memory resource 201-1 (e.g., on a lead transport vehicle 433-1, as shown and described in connection with FIG. 4) is capable of enabling performance of an operation by the second memory resource 201-2 that is different from an operation performable based upon data stored by the second memory resource 201-2 prior to enablement of a memory pool between the first memory resource and the available second memory resource. The second memory resource 201-2 may, in a number of embodiments, be on at least one of the transport vehicles 433-2, . . . , 433-M being led by lead transport vehicle 433-1. The combination component 112 may be further configured to contribute to transmission, via formation of the memory pool, of the data from the available first memory resource 201-1 to a corresponding available second memory resource 201-2. The data transmitted from the available first memory resource 201-1 may be stored by the corresponding second memory resource 201-1.

A first processing resource (e.g., 208-1 or 608), which includes the controller (e.g., as shown at 110 and/or 610-2), may be selectably coupled to a transceiver resource (e.g., as shown at 663-2) configured to transmit a request to wirelessly share the data. The request may be to share data from at least one first memory resource 201-1, where the data may correspond to a particular functionality having instructions for performance thereof stored in memory of a corresponding particular channel (e.g., as shown at 105-1 and/or 605-1) of the first memory resource 201-1. Performance of the particular functionality may be different following access of instructions stored by the second memory resource 201-2, including the data received from the first memory resource 201-1, relative to instructions previously stored in the memory.

As described herein, the first memory resource 201-1, coupled to the first processing resource 208-1, may be on a first transport vehicle configured to transport objects to a destination and the second memory resource 201-2, coupled to the second processing resource 208-2, may be on a second transport vehicle configured to transport objects to the destination. As such, the second memory resource 201-2 may be separate from the first memory resource 201-1 (e.g., by being formed and/or positioned on different transport vehicles, as described herein) and each may be configured to wirelessly share data between the first memory resource and the second memory resource.

An arbiter component (e.g., as shown in FIG. 1 at 114 in controller 110) may be configured to selectably determine whether the first memory resource 201-1 and the second memory resource 201-2 are authorized to enable formation of a memory pool to wirelessly share the data. As such, the arbiter component 114 may be configured to determine enablement of the memory pool between the first memory resource 201-1 and the second memory resource 201-2 responsive to a request for formation of the memory pool from either the first processing resource or the second processing resource.

A particular number of memory resources, from a plurality of potential memory resources, included in the memory pool may, in a number of embodiments, be selectably scalable responsive to a corresponding number of vehicles including a corresponding number of the second memory resources 201-2, 201-2, . . . , 201-N authorized by the controller 110-1 (e.g., the arbiter component 114). A bandwidth of the memory pool may be selectably scalable by a particular number of vehicles including the corresponding number of second memory resources authorized, by the controller 110-1 (e.g., the arbiter component 114), to be included in the memory pool. A particular number of memory resources, from a plurality of potential memory resources, included in the memory pool may be dynamically determined responsive to a number of vehicles including the corresponding number of second memory resources being mutually present within a particular sequence of vehicles in a particular time period. A particular number of memory resources, from a plurality of potential memory resources, included in the memory pool may be dynamically determined responsive to a number of vehicles including the corresponding number of second memory resources being authorized, by the controller 110-1 (e.g., the arbiter component 114), as a match in a particular time period with an authorization criterion.

The match may, in a number of embodiments, be determined, by the 110-1 (e.g., the arbiter component 114), as a match with at least one authorization criterion. For example, a plurality of authorization criteria (e.g., as shown in table 770 illustrated in FIG. 7) may be usable by the arbiter component 114 to selectably determine whether a vehicle (e.g., a first vehicle) including one first memory resource 201-2 and another vehicle including another second memory resource 201-3 (e.g., a second vehicle) are authorized to be included in the memory pool. As such, the match with the authorization criterion may be a match with at least one of: a particular proximity of the second memory resource 201-2 of the first vehicle relative to the second memory resource 201-3 of the second vehicle, as shown at 771, where the particular proximity may be a proximity that enables the first memory resource and the second memory resource to be included in a same sequence of vehicles; a timing of the request for the wirelessly shared data, as shown at 772, where the timing may correspond to a time of day and the authorization may be dynamically adjustable responsive to a determined density of memory resources at that time of day (e.g., higher density in rush hour may increase or reduce the number of resources authorized to be included in the memory pool); and/or a match of a protocol for wireless communication between a first transceiver resource 220-2 coupled to the second memory resource 201-2 of the first vehicle and a second transceiver resource 220-3 coupled to the second memory resource 201-3 of the second vehicle. The match of the protocol may be a match of proprietary encryption for an organization, a particular wireless fidelity (WiFi) protocol, and/or a protocol requiring a matched keyword with which a particular fraction of potential transport vehicles are associated, among other possibilities. As such, in a number of embodiments, the particular number of the plurality of memory resources included in the memory pool may correspond to a corresponding number of authorized vehicles, which in a number of embodiments may each be automated.

An operating mode component (e.g., as shown in FIG. 1 at 116 in controller 110) may be coupled to a processing resource 108 for each memory resource 201 included in the memory pool. For example, a first operating mode component 116-1 may be coupled to a first processing resource 208-1 for a first memory resource 201-1. The first operating mode component 116-1 may be configured to determine a particular number of a plurality of second memory resources 201-2 included in the memory pool. The first operating mode component 116-1 may be further configured to direct an operating mode component 116-2 coupled to each second processing resource 208-2 for the plurality of second memory resources 201-2 to modulate operating parameters for access and/or transmission of data from a number of memory devices 103 in the second memory resources 201-2 to correspond to the determined particular number of the plurality of second memory resources 201-2. For example, burst length of data allowed to be transmitted from the second memory resources 201-2 may, in a number of embodiments, be modulated to be shorter and/or cache prefectch operations may be modulated to be increased to correspond with a higher number of second memory resources 201-2 in the memory pool, among modulation of other possible operating parameters.

In a number of embodiments, a wireless base station 325 may be coupled to a first processing resource 208-1 coupled to a first memory resource 201-1. A second memory resource (e.g., 201-4) may be coupled to a second processing resource (e.g., 208-4) at at least one vehicle, as described herein. The first memory resource 201-1 is separate from the second memory resource 201-4 and each are configured to wirelessly share data between the first memory resource and the second memory resource via their respective processing resources. The at least one vehicle may be one or more vehicles selected from among the unitary vehicles 331 and/or the transport vehicles 333 described in connection with FIG. 3 and elsewhere herein.

Pooling of the second memory resource 201-4 of a vehicle with a first memory resource 201-1 may be performed via at least one wireless base station 325. For example, the second memory resource 201-4 may be pooled with one first memory resource 201-1 at a time via one wireless base station 325 or may be pooled with more than one first memory resource 201-1 at a time via a corresponding plurality of wireless base stations 325 (e.g., dependent upon geographical positioning of the vehicle with reference to one or more wireless base stations). In addition, the second memory resource 201-4 may be pooled with one or more first memory resources 201-1 at a time a in a sequence of such memory pools as the vehicle upon which the second memory resource 201-4 is positioned and/or formed transits through various geographical areas corresponding to, for example, access point and/or cloud coverage ranges.

A controller (e.g., a first controller 110-1 coupled to the first processing resource 208-1) may be configured to selectably determine whether the first memory resource 201-1 and the second memory resource 201-4, among possible other memory resources at the at least one vehicle, are authorized to enable formation of a memory pool. The controller may be configured to determine enablement of the memory pool between the first memory resource 201-1 and the second memory resource 201-4 responsive to a request for formation of the memory pool from either the first processor or the second memory resource. Data shared by the second memory resource 201-4 with the first memory resource 201-1, or shared by the first memory resource 201-1 with the second memory resource 201-4, based on enablement of the memory pool may enable direction of transit to an intended destination by a vehicle (a first vehicle) or another vehicle (a second vehicle, a third vehicle, and/or a fourth vehicle, among other possible vehicles). The transit may be directed by the first memory resource 201-1 to include performance of at least one operation by the vehicle or the other vehicle that is different from an operation performed based on data values previously stored by the second memory resource 201-4.

A response to a request from a second processing resource 208-4 at the vehicle or the other vehicle for access to the first memory resource 201-1 may be prioritized by the first processing resource 208-1 to enable real time updating of a mission profile and real time coordination of a convoy of vehicles (e.g., as described in connection with FIG. 5). For example, the first processing resource 208-1 coupled to the first memory resource 201-1 may transmit data (e.g., information) from the first memory resource 201-1 to enable direction of transit of the vehicle or the other vehicle before a request from the first memory resource 201-1 to access the second memory resource 201-4 is transmitted by the first processing resource 208-1.

The second processing resource 208-4, which may be associated with or include controller 110-4, may be selectably coupled to a plurality of switches 661 for a corresponding plurality of channels 605 of the second memory resource 201-4. The controller 110-4 may be configured to determine, responsive to selective activation of a particular switch, which particular channel is enabled to transmit, via a transceiver 220-4 selectably coupled to the particular channel, data stored in memory of the particular channel responsive to a request received from the first processing resource 208-1 coupled to the first memory resource 201-1. The controller 110-4 may be further configured to determine, responsive to selective activation of a particular switch, which particular channel is enabled to receive, via the transceiver 220-4 selectably coupled to the particular channel, data from the first memory resource 201-1 to be stored in the memory of the particular channel responsive to a request transmitted from the second processing resource 208-4.

The first processing resource 208-1 coupled to base station 325, which may be associated with or include controller 110-1, may be selectably coupled to a transceiver 220-1 configured to transmit a request for formation of a memory pool. The request may be to send data from the first memory resource 201-1 to the second memory resource 201-4 at the vehicle. The data may correspond to a particular functionality having instructions for performance thereof stored in memory of a particular channel of the first memory resource 201-1. Performance of the particular functionality by the second processing resource 208-4 of the second memory resource 201-4 at the vehicle may be different following access of stored instructions, including data received from the first memory resource 201-1, relative to instructions previously stored in memory of the corresponding particular channel of the second memory resource 201-4.

Alternatively or in addition, a request may be to send data from the second memory resource 201-4 at the vehicle to the first memory resource 201-1 coupled to the base station 325. The data may correspond to a particular functionality having instructions for performance thereof stored in memory of a particular channel of the second memory resource 201-4. Performance of the particular functionality by the first processing resource 208-1 of the first memory resource 201-1 coupled to the base station 325 may be different following access of stored instructions, including data received from the second memory resource 201-4, relative to instructions previously stored in memory of the corresponding particular channel of the first memory resource 201-1.

FIG. 8 is a flow chart illustrating an example of a method 880 for formation of a memory pool between selected wirelessly utilizable memory resources implemented on a corresponding number of vehicles and/or base stations in accordance with a number of embodiments of the present disclosure. Unless explicitly stated, elements of methods described herein are not constrained to a particular order or sequence. Additionally, a number of the method embodiments, or elements thereof, described herein may be performed at the same, or at substantially the same, point in time.

At block 881, the method 880 may, in a number of embodiments, include transmitting, via a fixed base station 325 coupled to a first memory resource 201-1, a request for data stored by a second memory resource (e.g., 201-2, . . . , 201-5) at a vehicle (e.g., an automated vehicle) to contribute to processing of a mission profile (e.g., as shown at 117 and described in connection with FIG. 1) stored by the first memory resource 201-1. The mission profile may be performed based at least in part on processing of instructions stored at the first memory resource 201-1 and the data transmitted from the second memory resource (e.g., 201-2) at the vehicle. In various embodiments, a particular number of a plurality of second memory resources may be positioned and/or formed on a corresponding number of a plurality of automated transport vehicles (e.g., as described in connection with FIGS. 1-7).

At block 882, the method 880 may, in a number of embodiments, include receiving, via the fixed base station in response to the request, the data from the second memory resource to contribute to the processing of the mission profile. The response may be wirelessly transmitted by the second processing resource (e.g., 208-2) coupled to the second memory resource (e.g., 201-2) at the first vehicle to enable formation of the memory pool to contribute to the processing of the mission profile. At least one of the request and the response may, in a number of embodiments, be transmitted via the base station. The response may, in a number of embodiments, be transmitted via a base station that is different from a base station from which the request was sent. In a number of embodiments, the request and the response may be sent directly vehicle to vehicle.

The method 880 may further include performing the mission profile differently by the second processing resource based upon processing of stored instructions, including the data transmitted from the first memory resource, relative to instructions stored by the mission profile prior to storage of the transmitted data. For example, the method 880 may further include forming the memory pool responsive to determination that data stored by the first memory resource may be capable of enabling improved elapsed time and/or safety of performance by the processing resource of the second memory resource of at least a portion of a previously stored mission profile.

In a number of embodiments, the method 880 may further include forming the memory pool to include more than two of a plurality of memory resources corresponding to more than two of the vehicles (e.g., automated transport vehicles) to transmit the data to contribute to the processing of the mission profile (e.g., as many resources as are authorized by the arbiter component 114 described in connection with FIGS. 1 and 6-7). For example, the memory pool may be formed to include the first memory resource 201-1 at the fixed base station 325, the second memory resource 201-2 at the vehicle, and one or more additional memory resources (e.g., 201-3, . . . , 201-N) at one or more additional vehicles. The data from each of the additional memory resources may be utilized to contribute to the processing of the mission profile (e.g., in addition to the data from memory resources 201-1 and/or 201-2).

The mission profile may include instructions to enable each of more than two vehicles to arrive at an intended destination (e.g., at or around an intended arrival time). An improved elapsed time and/or safety of performance of the previously stored mission profile may, in a number of embodiments, be based upon determination that the first memory resource or the second memory resource stores data representing at least one of mapping, imaging, and/or classifying of objects associated with (e.g., vehicles, road construction, and/or other movable or inanimate objects that potentially affect time and/or safety) an intended transit route of the previously stored mission profile. Upon such a determination, the memory pool may be formed to transmit at least one of the correspondingly mapped, imaged, and/or classified data to enable processing by the first processing resource or the second processing resource of an improved mission profile relative to the previously stored mission profile.

In a number of embodiments, the method 880 may further include directing the plurality of vehicles toward the intended destination on the route. A vehicle having a second memory resource may be selected (e.g., identified) as a lead vehicle in a sequence (e.g., convoy) of the plurality of vehicles. In various embodiments, one or more (e.g., all) of the plurality of vehicles may include a second memory resource (e.g., along with a second processing resource, as described herein) and a particular one of the plurality may be identified as the lead vehicle (e.g., based on being a first vehicle in the convoy, among other possible reasons). Hence, the method 880 may further include directing performance of at least a portion of a previously stored mission profile to enable improved elapsed time or safety of the transit toward the intended destination by formation of a memory pool between the lead vehicle and at least one other vehicle in the sequence.

For example, the method 880 may further include transiting a plurality of vehicles toward an intended destination on a route designated for operation of automated vehicles configured to transport objects (e.g., as described in connection with FIG. 5), positioning the first automated vehicle (e.g., transport vehicle 533-1) as a lead vehicle in a sequence of the plurality of automated vehicles (e.g., transport vehicles 533-1, . . . , 533-M), and directing, by the lead vehicle, performance of at least a portion of a previously stored mission profile to enable improved elapsed time or safety of the transit toward the intended destination by formation of the memory pool with at least one other of the plurality of automated transport vehicles in the sequence.

In a number of embodiments, the method 880 may further include transiting the plurality of automated transport vehicles on a particular route (e.g., route and/or lane 551) designated for operation of automated transport vehicles configured to commercially transport objects. In a number of embodiments, at least one unitary vehicle (e.g., at least one of notary vehicles 531-1, . . . , 531-O), driven by a human or autonomously, may be transited on a route proximal to the particular route (e.g., route and/or lanes 552, 553). In a number of embodiments, the memory pool may be formed between a processing resource on at least one of the plurality of automated transport vehicles and a third processing resource on at least one of the unitary vehicles.

In a number of embodiments, the method 880 may further include operating a first processing resource 208-1 coupled to the first memory resource 201-1 and a second processing resource 208-2 coupled to the second memory resource 201-2 as a resource wirelessly accessible by parties other than the fixed base station 325 and the plurality of vehicles. The other parties may include cloud processing resources 122, unitary vehicles 431, base stations 425, and/or infrastructure 444, 445, 446, in addition to being accessible by other parties (e.g., individuals, news media, privately owned and/or publicly owned organizations, and/or domestic and/or foreign governments, among others) having access to appropriate telephony and/or computing resources. In a number of embodiments, the method 780 may further include wirelessly selecting, by a party other than the vehicles, at least one of mapped, imaged, and classified data stored by the first memory resource or the second memory resource, and associated with a route transited by the first automated transport vehicle or the second automated transport vehicle, and forming s memory pool to transmit at least one of the mapped, imaged, and classified data to a third processing resource of the other party.

The method 880 may further include selecting, by a processing resource 208-1 coupled to the fixed base station 325, at least one of mapped, imaged, or classified, or any combination thereof, data stored by the first memory resource 201-1 or the second memory resource 201-2 and associated with the route identified by the vehicle or another vehicle. A memory pool may be formed to transmit at least one of the mapped, imaged, or classified, or any combination thereof, data to another processing resource (e.g., 208-3) of the other vehicle.

Alternatively or in addition, a method may, in a number of embodiments, include transmitting, by a first vehicle coupled to a first processing resource (e.g., second processing resource 208-2) coupled to a first memory resource (e.g., second memory resource 201-2), a request for data stored by a second memory resource (e.g., third memory resource 201-3) at a second vehicle concerning a mission profile. For example, the request for the data stored by the second memory resource 201-3 may be transmitted to contribute to processing of the mission profile stored by the first memory resource 201-2.

The method may further include receiving, via the first vehicle in response to the request, the data from the second memory resource 201-3 concerning the mission profile. For example, the data received from the second memory resource 201-3 may contribute to the processing of the mission profile.

The request may, in a number of embodiments, be transmitted by the first processing resource 208-2 coupled to the first memory resource 201-2 at the first vehicle and received by the second processing resource 208-3 coupled to a second memory resource (e.g., 201-3) at the second vehicle, where the request may be for formation of the memory pool to share data to contribute to processing of the mission profile by the first processing resource 208-2 at the first vehicle.

The method may further include identifying the first vehicle having the first memory resource 201-2 as a lead vehicle and the second vehicle having the second memory resource 201-3 as another vehicle in the sequence of vehicles. The request may be transmitted to a second processing resource 208-3 coupled to the second memory resource 201-3 via the base station 325 at the fixed access point or directly vehicle to vehicle. The memory pool may be formed, for example, to include the first memory resource 201-2 at the first vehicle, the second memory resource at the second vehicle 201-3, and the base station 325. In some embodiments, the memory pool may be formed to include just the first memory resource 201-2 at the first vehicle and the second memory resource at the second vehicle 201-3.

In a number of embodiments, the method may further include receiving, via the lead vehicle, data from the base station 325 concerning the mission profile and processing instructions stored by the first memory resource 201-2 at the first vehicle (e.g., the lead vehicle) and the data received from the base station 325 concerning the mission profile. The processing of the mission profile, including the instructions stored at the first memory resource 201-2 and the data received from the base station 325, may be performed at least in part by the first processing resource 208-2 coupled to the first memory resource 201-2 at the lead vehicle. The mission profile processed by the lead vehicle may be transmitted to the other vehicle coupled to the second processing resource 208-3. The processed mission profile may be performed by the second processing resource 208-3 at the other vehicle.

In a number of embodiments, the method may further include transmitting the request to the second processing resource 208-3 coupled to the second memory resource 201-3 via the base station 325. The memory pool may be formed to include the first memory resource 201-2 at the first vehicle, the second memory resource 201-3 at the second vehicle, and the base station 325. The method may further include receiving, via the first vehicle in response to the request, the data from the second memory resource 201-3 and data from a third memory resource 201-1 at the base station 325 to contribute to the processing of the mission profile.

In the above detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, particularly with respect to the drawings, reference numbers with hyphenated digits and/or designators such as "X", "Y", "N", "M", etc., (e.g., 103-1, 103-2, 103-3, and 103-N in FIG. 1) indicate that a plurality of the particular feature so designated may be included. Moreover, when just the first three digits are utilized (e.g., 103) without the hyphenation, the digits are presented to generally represent, in some embodiments, all of the plurality of the particular feature.

It is also to be understood that the terminology used herein is for the purpose of describing particular embodiments only, and is not intended to be limiting. As used herein, the singular forms "a", "an", and "the" include singular and plural referents, unless the context clearly dictates otherwise, as do "a number of", "at least one", and "one or more" (e.g., a number of memory arrays may refer to one or more memory arrays), whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically for access to and/or for movement (transmission) of instructions (e.g., control signals, address signals, etc.) and data, as appropriate to the context. The terms "data" and "data values" are used interchangeably herein and may have the same meaning, as appropriate to the context (e.g., one or more data units or "bits").

While example embodiments including various combinations and configurations of memory resources, processing resources, transceiver resources, memory devices, controllers, mission profiles, unitary vehicles, transport vehicles, base stations, infrastructure, and switches, among other components for formation of a memory pool between selected memory resources have been illustrated and described herein, embodiments of the present disclosure are not limited to those combinations explicitly recited herein. Other combinations and configurations of the memory resources, processing resources, transceiver resources, memory devices, controllers, mission profiles, unitary vehicles, transport vehicles, base stations, infrastructure, and switches for formation of a memory pool between selected memory resources disclosed herein are expressly included within the scope of this disclosure.

Although specific embodiments have been illustrated and described herein, those of ordinary skill in the art will appreciate that an arrangement calculated to achieve the same results may be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a first memory resource; and
a first processor coupled to the first memory resource wherein:
the first memory resource, the first processor, or both are configured to:
receive a request from a different apparatus to access a second memory resource in communication with the first memory resource from the first processor;
in response to the request, enable formation of a memory pool to share data between the first memory resource and the second memory resource; and
determine data received by the first memory resource from the second memory resource enables performance of a particular functionality stored by the first memory source,
wherein the data received by the first memory resource from the second memory resource is determined to enable performance of the particular functionality as at least part of a mission profile for transit of the different apparatus.

2. The apparatus of claim 1, wherein:
the data received by the first memory resource from the second memory resource is further determined to enable direction of transit to an intended destination by the different apparatus; and the direction of transit is directed by the first memory resource to include performance of at least one operation by the different apparatus that is different from an operation performed based on data values previously stored by the second memory resource.

3. The apparatus of claim 1, wherein:
the first memory resource is configured to wirelessly share data with the second memory resource; and
wherein a response to a request from a second processor coupled to the second memory resource for access to the first memory resource is prioritized by the first processor to enable real time updating of the mission profile and real time coordination of a convoy of apparatuses such that the first processor coupled to the first memory resource transmits data to enable direction of transit of the apparatus before a request from the first memory resource to access the second memory resource is transmitted.

4. The apparatus of claim 1, wherein:
performance of an operation by the first processor coupled to the first memory resource is enabled based on processing of data values shared by a second processor coupled to the second memory resource; and
the data values shared by the second processor include at least one data value different from data values previously stored by the first memory resource.

5. The apparatus of claim 1, wherein the particular functionality comprises storage of data values to direct performance of a number of operations that contribute to performance of the particular functionality.

6. A method, comprising:
transmitting a request for data from a first memory resource at a first vehicle;
receiving, in response to the request, the data from the first memory resource;
forming a memory pool to share data between a first memory resource and a second memory resource by pooling the first memory resource with the second memory resource;
transmitting the data from the first memory resource to a second memory resource at a second vehicle to contribute to processing of a mission profile stored on the second memory resource;
determining data received by the first memory resource from the second memory resource enables performance of a particular functionality stored by the first memory source as at least part of the mission profile for transit of the second vehicle; and
determining the data received by the first memory resource from the second memory resource is further determined to enable direction of transit to an intended destination by the second vehicle.

7. The method of claim 6, further comprising scaling a bandwidth of the memory pool by a particular number of vehicles including a corresponding number of additional memory resources authorized for inclusion in the memory pool.

8. The method of claim 6, further comprising enabling formation of the memory pool with more than one first memory resource at a time via the apparatus and a plurality of additional apparatuses.

9. The method of claim 6, further comprising:
forming the memory pool including a third memory resource at a fixed based station and one or more additional memory resources at one or more additional vehicles,
wherein data from each of the one or more additional memory resources contributes to the processing of the mission profile.

10. The method of claim 6, further comprising forming the memory pool responsive to determining that data stored by the first memory resource enables improved elapsed time of performance, safety of performance, or both.

11. The method of claim 6, further comprising performing the mission profile based at least in part on processing of instructions stored at the first memory resource and the data transmitted from the second vehicle.

12. The method of claim 6, further comprising wirelessly transmitting the mission profile from the first memory resource to the second memory resource.

13. An apparatus, comprising:
a processor coupled to a first memory resource;
a first controller configured to:
determine whether the first memory resource and the second memory resource are authorized to enable formation of a memory pool; and
determine enablement of the memory pool between the first memory resource and a second memory resource responsive to a request for formation of the memory pool from either the processor or the second memory resource;
the first memory resource configured to:
wirelessly share data with the second memory resource;
receive the data from a particular memory device of the second memory resource determined by a second controller; and
determine data received by the first memory resource from the second memory resource enables performance a particular functionality stored by the first memory source;
wherein the particular functionality comprises storage of data values to direct performance of a number of operations that contribute to performance of the particular functionality.

14. The apparatus of claim 13, wherein:
data shared by the second memory resource with the first memory resource enables direction of transit to an intended destination by a vehicle; and
the direction of transit is directed by the first memory resource to include performance of at least one operation by the vehicle that is different from an operation performed based on data values previously stored by the second memory resource.

15. The apparatus of claim 13, further configured to transmit data from the first memory resource to the second memory resource, in response to a request from the processor for formation of the memory pool, wherein the data corresponds to the particular functionality having instructions for performance thereof stored in memory of a particular channel of the first memory resource.

16. The apparatus of claim 13, wherein a particular number of a plurality of memory resources included in the memory pool is scalable responsive to a number of different apparatuses including a corresponding number of memory resources authorized by the first controller.

17. The apparatus of claim 13, further configured to:
transmit a request for data stored by the second memory resource at a different apparatus concerning a mission profile;
identify the apparatus as a lead vehicle and the different apparatus as another vehicle in a sequence of vehicles;
form the memory pool comprising the first memory resource and the second memory resource;

receive data from a base station coupled to the memory pool concerning the mission profile; and transmit the data concerning the mission profile to the second memory resource.

18. The apparatus of claim 17, further configured to:

direct a plurality of vehicles toward an intended destination on a route;

identify a vehicle having the second memory resource as a lead vehicle in a sequence of the plurality of vehicles; and direct performance of at least a portion of a previously stored mission profile to enable improved elapsed time or safety of the direction of transit toward the intended destination by formation of the memory pool between the lead vehicle and at least one other vehicle in the sequence.

19. The apparatus of claim 18, wherein a bandwidth of the memory pool is scalable by a particular number of vehicles including a corresponding number of memory resources authorized for inclusion in the memory pool.

* * * * *